(12) United States Patent
Shibata

(10) Patent No.: US 9,170,161 B2
(45) Date of Patent: Oct. 27, 2015

(54) IMAGE CAPTURE DEVICE, PIXEL OUTPUT LEVEL COMPENSATION METHOD FOR SAME, INFRARED CAMERA SYSTEM, AND INTERCHANGEABLE LENS SYSTEM

(75) Inventor: Yukiko Shibata, Saitama (JP)

(73) Assignee: Nippon Avionics Co., Ltd., Tokyo (JP)

( * ) Notice: Subject to any disclaimer, the term of this patent is extended or adjusted under 35 U.S.C. 154(b) by 809 days.

(21) Appl. No.: 13/434,661

(22) Filed: Mar. 29, 2012

(65) Prior Publication Data

US 2012/0249799 A1 Oct. 4, 2012

(30) Foreign Application Priority Data

Mar. 30, 2011 (JP) ................................ 2011-075285

(51) Int. Cl.
*H04N 5/217* (2011.01)
*H04N 5/33* (2006.01)
*G01J 5/20* (2006.01)
(Continued)

(52) U.S. Cl.
CPC ................. *G01J 5/20* (2013.01); *G01J 5/0022* (2013.01); *G01J 5/26* (2013.01); *G03B 5/02* (2013.01); *G03B 17/14* (2013.01); *H04N 5/33* (2013.01); *H04N 5/3653* (2013.01); *G01J 2005/0048* (2013.01); *G01J 2005/0077* (2013.01); *G03B 2205/0092* (2013.01)

(58) Field of Classification Search
CPC ........... G06K 9/00; H04N 5/228; H04N 5/33; G01N 23/00
USPC .......... 348/164, 208, 222, 345; 345/474, 619; 382/106
See application file for complete search history.

(56) References Cited

U.S. PATENT DOCUMENTS 7,645,990 B2 1/2010 Takemura et al.
2002/0126209 A1 9/2002 Yamada et al.
(Continued)

FOREIGN PATENT DOCUMENTS

JP 2001-506433 A 5/2001
JP 2002-310804 10/2002
(Continued)

OTHER PUBLICATIONS

Office Action dated Dec. 16, 2014, issued in corresponding Japanese Patent Application No. 2011-075285, with English translation (18 pages).
(Continued)

*Primary Examiner* — Sath V Perungavoor
*Assistant Examiner* — Amadihe Kennon
(74) *Attorney, Agent, or Firm* — Westerman, Hattori, Daniels & Adrian, LLP

(57) ABSTRACT

An image capture device and method for correcting output levels thereof, made up of an image shifter for moving an image position on a light receiving surface, having a differential calculating section for calculating the differential between the output levels of pixels receiving light from the same part of an image on a light-receiving surface before and after moving the image position; an offset amount calculating section for calculating the amount of offset to the output levels of pixels in a pixel line by sequentially adding the differences in output levels in pixel lines arrayed in the direction of image position movement; and a correcting section for correcting pixel output levels by equalizing the variability in output levels between pixels in a pixel line based on the amount of pixel offset in the pixel line.

13 Claims, 17 Drawing Sheets

(51) Int. Cl.
*G03B 5/02* (2006.01)
*G03B 17/14* (2006.01)
*H04N 5/365* (2011.01)
*G01J 5/26* (2006.01)
*G01J 5/00* (2006.01)

(56) References Cited

U.S. PATENT DOCUMENTS

| | | | |
|---|---|---|---|
| 2003/0137517 A1* | 7/2003 | Kondo et al. | 345/474 |
| 2004/0252135 A1* | 12/2004 | Ono | 345/619 |
| 2006/0072044 A1 | 4/2006 | Kawamura et al. | |
| 2007/0071433 A1 | 3/2007 | Kawanami | |
| 2007/0071434 A1 | 3/2007 | Kawanami | |
| 2008/0099679 A1 | 5/2008 | Takemura et al. | |
| 2008/0267454 A1* | 10/2008 | Kobayashi et al. | 382/106 |
| 2009/0273675 A1* | 11/2009 | Jonsson | 348/164 |
| 2010/0188532 A1 | 7/2010 | Kusaka et al. | |
| 2011/0025875 A1* | 2/2011 | Imade | 348/222.1 |
| 2011/0102742 A1 | 5/2011 | Miyasa et al. | |
| 2011/0273608 A1* | 11/2011 | Tsukada | 348/345 |
| 2012/0133786 A1* | 5/2012 | Watanabe et al. | 348/208.4 |
| 2012/0154626 A1 | 6/2012 | Hatakeyama et al. | |
| 2012/0176505 A1 | 7/2012 | Kim et al. | |
| 2012/0249799 A1 | 10/2012 | Shibata et al. | |
| 2013/0021484 A1* | 1/2013 | Sorek et al. | 348/208.4 |
| 2013/0147797 A1* | 6/2013 | Tanaka | 345/419 |

FOREIGN PATENT DOCUMENTS

| | | |
|---|---|---|
| JP | 2003-116042 A | 4/2003 |
| JP | 2007-104445 A | 4/2007 |
| JP | 2008-111754 | 5/2008 |
| JP | 2008-203054 | 9/2008 |

OTHER PUBLICATIONS

Office Action dated Feb. 3, 2015, issued in related Japanese Patent Application No. 2011-101482, with English translation (7 pages).
U.S. Office Action dated Dec. 22, 2014, issued in U.S. Appl. No. 13/457,268 (23 pages).

* cited by examiner

IMAGE CAPTURE DEVICE, PIXEL OUTPUT LEVEL COMPENSATION METHOD FOR SAME, INFRARED CAMERA SYSTEM, AND INTERCHANGEABLE LENS SYSTEM

CROSS-REFERENCE TO RELATED APPLICATIONS

The present patent application claims priority from Japanese Patent Application No. 2011-075285, filed Mar. 30, 2011, which is incorporated herein by reference in its entirety.

TECHNICAL FIELD

The present invention pertains to an image capture device, a method for compensating pixel output levels thereof, an infrared camera system, and an interchangeable lens system, and more particularly to an image capture device, a method for compensating pixel output levels thereof, an infrared camera system, and an interchangeable lens system with which variability in output levels between pixels can be averaged.

BACKGROUND ART

Examples of conventional image capture devices are set forth in Patent Citations 1 through 3 below. In the infrared image capture devices set forth in Patent Citations 1 through 3, a reference image is obtained by closing a correction shutter; the amount of shift in individual pixel output levels is obtained from the reference image to correct for variability in output levels between pixels.

PRIOR ART REFERENCES

Patent References

Patent Citation 1: Published Unexamined Patent Application 2002-310804
Patent Citation 2: Published Unexamined Patent Application 2008-111754
Patent Citation 3: Published Unexamined Patent Application 2008-203054

DISCLOSURE OF THE INVENTION

Problems the Invention Seeks to Resolve

All of these conventional image capture devices, however, required frequent closing of a correction. An image capture device cannot capture images of objects while a correction shutter is closed. Therefore when these conventional image capture devices were used as monitor cameras such as security cameras or the like, the problem arose that events occurring while a correction shutter was closed, short though that time might be, could not be monitored. In addition, because conventional image capture devices cannot output newly captured moving image frames while the correction shutter is closed, moving images are interrupted.

The present invention therefore has the object of providing an image capture device capable of equalizing variability in output levels between pixels without closing a correction shutter, and of providing a method for that pixel output level correction, and an infrared camera system and interchangeable lenses for same.

Means for Resolving the Problem

In order to achieve the aforementioned objective, the image capture device comprising: an image capturing means having a light-receiving surface, arrayed on which are pixels composed of image capturing elements for outputting electrical signals at output levels responsive to received light intensity; optics capable of forming an image of an object on the light receiving surface; an image shifting means for moving a position of the image on the light receiving surface; and an image processing means for processing the image captured by the image capturing means; wherein the image capturing means captures the image on the light-receiving surface before and after movement of the image position by the image shifting means; wherein the image processing means has: a differential calculating section for calculating differences in output levels between pixels receiving light for the same part of the image on the light-receiving surface before and after moving the image position; an offset amount calculating section for sequentially adding the differences in output levels for a pixel line arrayed in the direction of movement of the image position, so as to calculate offset amounts for output levels of pixels in the pixel line; and a correction section for correcting output levels of pixels so as to equalize variability in output levels between pixels in the pixel line, based on the offset amounts.

In the image capture device of the present invention, an image position is moved relative to a light-receiving surface. A differential $\Delta 1$ is then calculated between the output level of a first pixel receiving light in a portion in which an image is present before moving the image position, and the output level of a second pixel receiving light for the same portion after it is moved. What is important here is that this difference $\Delta 1$ is equivalent to the difference between the first and second pixels when a correction shutter of uniform brightness (or temperature) is closed and an image captured. Therefore the present invention enables the output level difference $\Delta 1$ between the first and second pixels to be obtained without closing a correction shutter.

For the differential between output levels among pixels receiving light for the same portion of an image, as with the differential $\Delta 1$ in the output levels between a first pixel and second pixel, a $\Delta 2$ is calculated for the difference between output levels of the second and third pixel, as is a $\Delta 3$ for the difference between output levels of the third and fourth pixels, . . . and a $\Delta n$ for the difference between output levels of the nth pixel and the (n+1) pixel. Note that "n" is a positive integer.

In addition, the amount of shift in the output level of pixels in that pixel line is calculated by sequentially adding pixels differences $\Delta 1$, $\Delta 2$, $\Delta 3$, . . . etc. along the direction of movement of the image position. I.e., assuming a first pixel shift amount of 0, for example, the shift amount for the second pixel is calculated to be $\Delta 1$, $(\Delta 1+\Delta 2)$ for the third pixel shift amount, and similarly $(\Delta 1+\Delta 2+\Delta 3+\ldots+\Delta n)$ for the n+1 pixel shift amount. Thus in the present invention, the shift amount in individual pixel output levels can be calculated without closing the correction shutter. Therefore in the present invention variability in output levels between pixels can be equalized without closing a correction shutter.

In the present invention, the image shifting means preferably moves the image position in the direction of the pixel array by a distance N times the pixel spacing on the light receiving surface (where N is a positive integer); the differential calculating section calculates differences, for each pixel, in output levels between pixels shifted by N pixels from each other in pixel lines arrayed in the direction of motion of the image position; the offset amount calculating section adds the differences every Nth pixels in sequence, using each pixel from the first pixel to the Nth pixel in the pixel line as starting points, thereby calculating the offset amount in output level for each pixel in the pixel line.

Assuming N=1, when the image position is moved by one pixel spacing (pixel pitch) only, the differential is calculated between adjacent pixels in a pixel line along the direction of movement of the image position. The differential between adjacent pixels is then sequentially added to calculate the amount of offset to output levels between each pixel in a pixel line. Assuming N=2, when the image position is moved by two pixel pitches only, the differential is calculated between every other pixel in a pixel line along the direction of movement of the image position. The differential between every other pixel is then sequentially added to calculate the amount of offset in output levels between every other pixel in a pixel line. In this case, it is also acceptable to calculate the respective output level offset amount for an even-numbered pixel group in the pixel line, and output level offset amount for an odd-numbered pixel group in the pixel line.

Also, in the present invention the image processing means preferably corrects the output level for each pixel according to the position of the pixel on the light-receiving surface so as to cancel out an effect of shading by the image capture device.

Shading is the phenomenon whereby in an infrared image capture device, owing to internal surface radiation and stray light inside the image capture device unrelated to the photographed object, the amount of infrared light received by image capturing elements on the light-receiving surface increases from the center portion toward the peripheral portion of the light-receiving surface when ambient temperature is high, and declines from the center portion toward the peripheral portion of the light-receiving surface when ambient temperature is low. Given two pixels receiving light from the same portion of an image before and after the image movement of the image, if one is disposed close to the optical axis of the optics, and the other is disposed at a remove from the optics, the intensity of light received by these two pixels is unequal due to the effects of shading. The output levels of these two pixels are therefore also affected by shading. As a result, the differential between the output levels of these two pixels is also affected by shading. Therefore correcting the output levels for each pixel to cancel out shading characteristics permits a more accurate differential between output levels among pixels to be obtained. Corrections can therefore be made to eliminate the effects of shading characteristics and make the variability in pixel output levels more uniform. Note that this form of shading is also referred to as background.

In the present invention, the image shifting means preferably returns the image position back to the pre-movement image position after movement of the image position, and the image capturing means once again captures the image on the light-receiving surface after returning the image position to its original position; the image processing means calculates the amount of change in output levels for the same pixels before moving and after restoring the image position; and the offset amount calculating section eliminates the difference for a pixel having a change amount equal to or greater than a predetermined reference value, and calculates an offset amount.

When a photographed subject moves, the differential in calculated pixel output levels may not accurately reflect differences in output levels caused by variations in the output characteristics of the pixels themselves. It is therefore desirable for the differential between pixels receiving light from the image portion corresponding to the moving portion of the photographed subject to be removed from the calculation of the offset amount. Portions of the image in which the amount of output level fluctuation is large between the time before the image position is moved and the time after the image position is restored are treated as parts of the photographed subject which have moved, and are therefore deleted. Offset amounts can be this means be prevented from becoming inaccurate.

With respect to pixels deleted from the calculation of offset amounts, it is also acceptable to apply the previously valid differential value and add to calculate the offset amount. It is also acceptable to substitute the previously valid offset amount instead of calculating the offset amount by addition.

In the present invention, the image capture means preferably has a light-receiving surface on which pixels are arrayed in a two dimensional matrix; the image shifting means causes a image position to move in a first alignment direction on the light-receiving surface and in a second alignment direction perpendicular to the first alignment direction; the differential calculating section: calculates differences in output levels between pixels receiving light for the same part of the image before and after the image position is moved in the first alignment direction as first differentials, and calculates differences in output levels between pixels receiving light for the same part of the image before and after the image position is moved in the second alignment direction as second differentials; the offset amount calculating section: sequentially adds the first differentials in a first pixel line arrayed in the first alignment direction to calculate first offset amounts for the pixels in the first pixel line, and sequentially adds the second differentials in a second pixel line arrayed in the second alignment direction to calculate second offset amounts for the pixels in the second pixel line; and the correction section corrects output levels of pixels based on the first and second offset amounts.

A more accurate correction can thus be achieved, since pixel output levels are corrected based on first and second offset amounts respectively calculated for first and second alignment directions.

With respect to pixels removed from the calculation of offset amounts, those offset amounts can also be calculated by adding only the valid direction of either the first or the second alignment direction relative to pixels deleted from the calculation of offset amounts.

Note that when moving the respective image positions in the first and second alignment directions, the path of movement from pre-movement image position to post-movement image position is not considered. For example, it is also acceptable to move from a pre-movement position temporarily to a third position, then move to the post-movement position.

In the present invention, the image shifting means preferably moves the image position translationally so that the track of any given point in an image on the light-receiving surface describes a circular orbit on the light-receiving surface; the image capturing means captures the image on the light-receiving surface before and after a given point of the image moves in a predetermined part of the circular orbit; the differential calculating section calculates the differences in output levels between pixels receiving light for the same part of the image before and after the given point in the image moves in a predetermined part on the circular orbit; and the offset amount calculating section calculates offset amounts using a straight line direction which connects pixels receiving light for the same part of an image as the direction of movement.

An image position can thus be continuously moved by moving the image position so as to cause its track to describe a circular orbit. Positioning accuracy for the image position can thus be easily attained. This enables good positioning accuracy of the image position.

In the present invention, the image shifting means preferably moves the image position so that any desired point in the image on the light-receiving surface makes a continuous constant velocity circular movement.

An image position can thus be stably moved by moving the image position to continuously implement a uniform velocity straight line movement. Corrections can also be easily implemented in each cycle of the circular movement of the image position.

In the present invention, the image capturing means and the image processing means preferably comprise an image capture device; the optics and the image shifting means comprise a lens unit detachable from the image capture device main body; the image capture device main body outputs data including pixel spacing on the light-receiving surface to the lens unit; and the image shifting means moves the image position based on the data.

Pixel spacing on the light-receiving surface normally differs depending on the type of image capture device main body. An image shifting means built into a lens unit such as an interchangeable lens is capable of matching the amount of image position movement to the pixel spacing on the light-receiving surface of the image capture device main body based on data, which includes pixel spacing, sent from the image capture device main body.

In the present invention, the image capturing means preferably outputs a sync signal in sync with the timing at which images on the light-receiving surface are captured; and the image shifting means moves to an image position based on the sync signal.

Accurate correction can thus be achieved by matching the image position movement and image capture timing.

In the present invention, the image shifting means preferably outputs a sync signal in sync with the timing at which the image position is moved, and the image capturing means captures an image on the light-receiving surface based on the sync signal.

Accurate correction can thus be achieved by matching the image position movement and image capture timing.

In the present invention, the image capturing element is preferably a bolometer or a microbolometer.

Constituting the image capturing element of a bolometer or microbolometer enables the image capture device of the present invention to capture infrared images.

The pixel output level correcting method in an image capture device including an image capturing means having a light-receiving surface, arrayed on which are pixels comprising image capturing elements for outputting electrical signals at an output level responsive to received light intensity, and optics capable of forming an image of an object on the light-receiving surface, wherein: a position of the image is moved on the light-receiving surface; and the image on the light-receiving surface is captured before and after moving the image position; differences in output levels between pixels receiving light for the same portion of the image on the light-receiving surface before and after moving the image position is calculated, the differences in output levels are sequentially added for a pixel line arrayed in the direction of image position movement so that offset amounts are calculated for output levels of pixels in the pixel line; and output levels of pixels are corrected so as to equalize variability in output levels between pixels in the pixel line, based on the offset amounts.

Therefore by using the method for correcting image capture device pixel output levels of the present invention, variability between pixel output levels in the image capture device of the present invention can, as described above, be equalized without closing a correction shutter. Even in cases where temperature can be measured using a temperature correction shutter, the frequency with which temperature calibration is performed by closing the temperature correcting shutter can be reduced.

The infrared camera system of the present invention comprising: an image capturing means having an infrared light-receiving surface, arrayed on which are pixels composed of image capturing elements for outputting electrical signals at output levels responsive to received light intensity; optics capable of forming an image of an object on the light receiving surface; an image shifting means for moving a position of the image on the light receiving surface; and an image processing means for processing the image captured by the image capturing means; wherein the image capturing means captures the image on the light-receiving surface before and after movement of the image position by the image shifting means; the image processing means has: a differential calculating section for calculating differences in output levels between pixels receiving light for the same part of the image on the light-receiving surface before and after moving the image position; an offset amount calculating section for sequentially adding the differences in output levels in a pixel line arrayed in the direction of movement of the image position, so as to calculate offset amounts for output levels of pixels in the pixel line; and a correction section for correcting output levels of pixels so as to equalize variability in output levels between pixels in the pixel line, based on the offset amounts.

Variability in output levels between pixels detecting infrared can therefore be equalized without closing a correction shutter.

The interchangeable lens system comprising: an image capture device main unit; and a lens unit removable from the image capture device main unit, wherein the image capture device body including: an image capture device comprising an image capturing means having a light-receiving surface, arrayed on which are pixels composed of image capturing elements for outputting electrical signals at output levels responsive to received light intensity; and an image processing means for processing images captured by the image capturing means, wherein the lens unit image capture device including: an image capturing means having a light-receiving surface, arrayed on which are arrayed pixels composed of image capturing elements for outputting electrical signals at output levels responsive to received light intensity; optics capable of forming an image of an object on the light receiving surface; and an image shifting means for moving the position of an image on the light receiving surface; wherein the image capturing means captures the respective images on the light-receiving surface before and after movement of the image position by the image shifting means, wherein the image processing means has: a differential calculating section for calculating differences in output levels between pixels receiving light for the same part of the image on the light-receiving surface before and after moving the image position; an offset amount calculating section for sequentially adding the differences in output levels in pixel lines arrayed in the direction of movement of the image position, so as to calculate offset amounts for output levels of pixels in the pixel line; and a correction section for correcting output levels of pixels so as to equalize variability in output levels between pixels in the pixel line, based on the offset amounts.

Variability in output levels between pixels can therefore be equalized without closing a correction shutter.

Effect of the Invention

Thus the variability in output levels between pixels can be equalized without closing a correction shutter by using the image capture device, pixel output level correction method, and infrared camera system and interchangeable lens system of the present invention.

OPTIMAL EMBODIMENTS OF THE INVENTION

Figure 1:
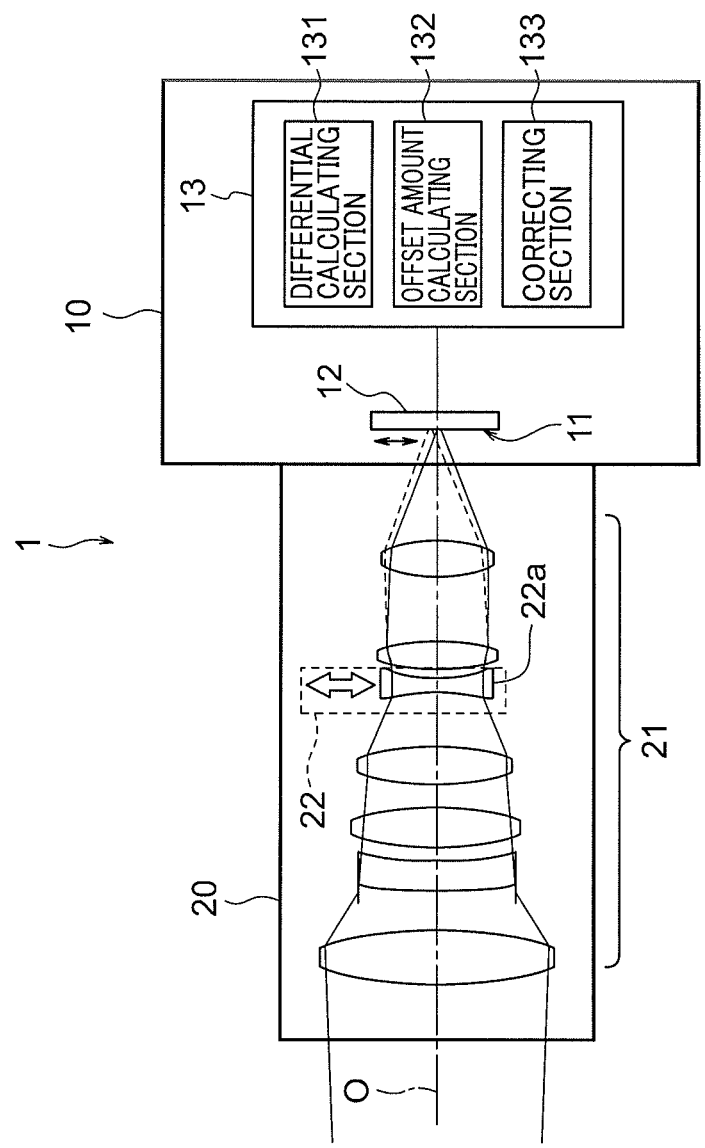
FIG. 1: A block diagram explaining the constitution of an image capture device according to an embodiment of the present invention.

Below, referring to the attached drawings, we discuss embodiments of the image capture device and pixel output level correction method for same according to the present invention. Note that embodiments of the image capture device also serve as embodiments of the infrared camera system and interchangeable lens system. First, referring to the block diagram in FIG. 1, we explain an image capture device in an embodiment. The image capture device 1 shown in FIG. 1 comprises a camera body 10 and a lens unit 20. The lens unit 20 may be an interchangeable lens, detachable from the camera body 10.

The camera body 10 is furnished with a image capturing means 12 having a light receiving surface 11, on which are arrayed pixels comprising image capturing elements for outputting electrical signals at output levels responsive to received light intensity, and an image processing means 13 for processing images captured by the image capture means 12 The light receiving surface of the image capturing means 12 may be constituted as a bolometer array or a microbolometer array for detecting infrared; it may also be constituted as a solid image capturing element array such as a CCD (Charge Coupled Device) image sensor or a CMOS (Complementary Metal Oxide Semiconductor) image sensor.

The lens unit 20 is furnished with optics 21 capable of forming an image of a photographed subject, and an image shifting means 22 for moving an image position on the light receiving surface 11. The image shifting means 22 may consist of an anti-shake mechanism. In the example shown in FIG. 1, the image shifting means 22 moves an image position relative to the light receiving surface 11 by translationally moving one of the lenses 22*a* comprising the optics 21 in a direction perpendicular to the optical axis O of the optics 21. Note that the entire image within the image capture field is included in the object.

The image shifting means 22 may also be constituted to translationally move the entire optics 21 in a direction opposite the optical axis O, and the light receiving surface 11 may be constituted to translationally move the light receiving surface 11 within a plane perpendicular to the optical axis O.

The camera body 10 image processing means 13 captures the respective images on the light receiving surface 11 before and after movement of the image position by the image shifting means 22. The image processing means 13 has: a differential calculating section 131 for calculating the differential between output levels between pixels receiving light for the same portion of the image on the light receiving surface 11 before and after movement of the image position; an offset amount calculating section 132 for calculating the amount of offset to the output levels of pixels in a pixel line by sequentially adding the differences in output levels in pixel lines arrayed in the direction of image position movement; and a correcting section 133 for correcting pixel output levels by equalizing the variability in output levels between pixels in a pixel line based on the amount of pixel offset in the pixel line.

First Operating Example

Figure 2:
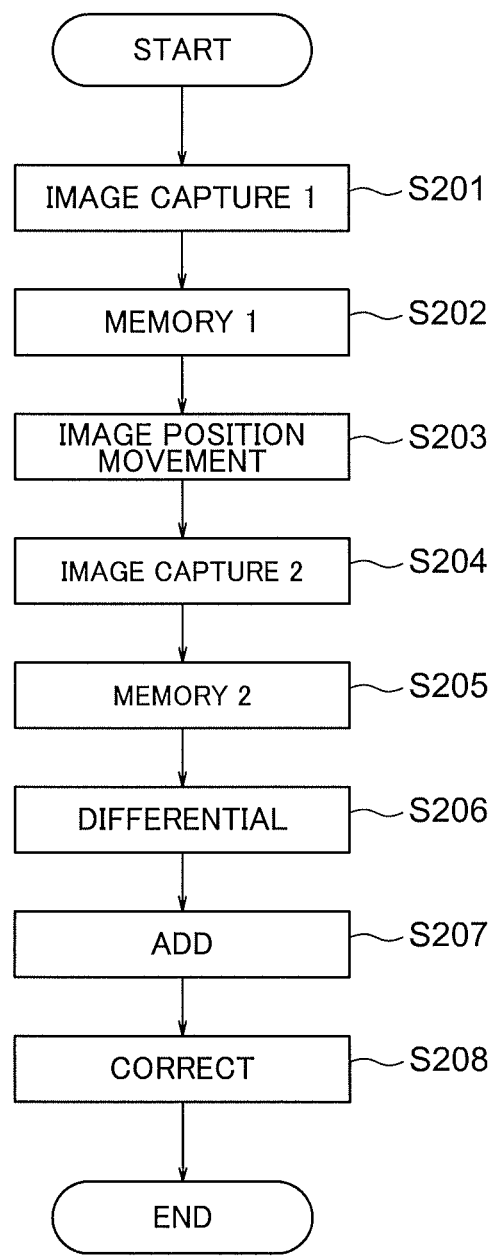
FIG. 2: A flow chart explaining a first operating example of an image capture device according to an embodiment of the present invention.

Referring to the FIG. 2 flow chart, we discuss a first operating example of the image capture device 1 according to the present embodiment.

First, prior to movement of the image position by the image shifting means 22, the image capturing means 12 captures an image on the light receiving surface 11 (S201). Here, in the top portion of FIG. 3(*a*), we show an example of an image on the light receiving surface 11 prior to image movement. The light-receiving surface in FIG. 3(*a*) is made up of pixels arrayed in a 2 dimensional matrix. The right hand part of the image focused on the light receiving surface 11 is shown with hash marks.

Next, the output levels of each pixel in the image captured prior to image movement are stored in a first image memory (S202). A first image memory is provided in the camera body 10.

Figure 3A:
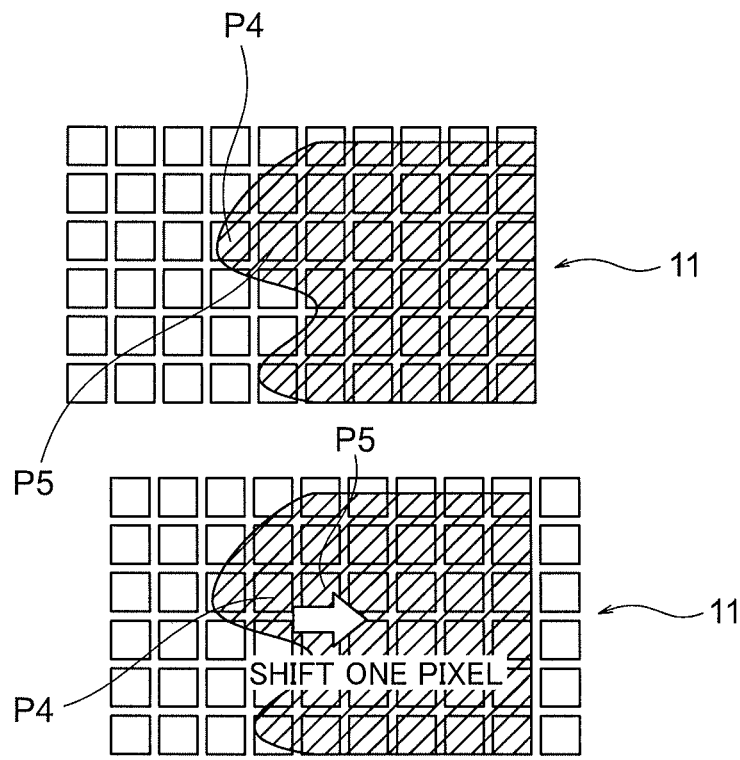
FIG. 3: (*a*): a diagram showing the positional relationship between the light-receiving surface and the image before and after moving the image position; (*b*): a diagram showing the light-receiving surface.

Next, the image shifting means 22 moves the image position by the distance of the pixel spacing on the light receiving surface 11 (1 pixel pitch) in the direction in which the pixels are arrayed (S203). In the bottom portion of FIG. 3(a), we show an example of an image on the light receiving surface 11 after image movement. FIG. 3(a) shows the appearance after the light receiving surface 11 perpendicular to the optical axis O is moved rightward by 1 pixel pitch relative to the image. This movement corresponds to moving the image position by 1 pixel pitch to the left relative to the light receiving surface 11.

Next, after movement of the image position by the image shifting means 22, the image capturing means 12 captures the image on the light receiving surface 11 (S204). Comparing the top and bottom portion of FIG. 3(a), we see that as a result of moving the light receiving surface 11 by one pixel pitch relative to the image position, the same part of the image for which light was received by pixel P5 on the light receiving surface 11 prior to position movement is now received by pixel P4 on the light receiving surface. Similarly, with respect to the same parts of an image for individual pixels respectively received light prior to moving the image position, light after movement is received by the respectively left adjacent pixels thereto over the entire light receiving surface 11.

Next, the output levels for each pixel in the captured image are stored in a second image memory. The second image memory is provided in the camera body 10 (S205).

Next, a differential calculating section 131 in the image processing section 13 calculates the differential in output levels between pixels receiving light for the same part of the image on the light receiving surface 11 before and after moving the image position. For example, a difference $\Delta(p'4-p5)$ is calculated between the pre-image movement output level p5 of pixel P5 stored in the first image memory and the post-image movement output level I p'4 of pixel P4 (S206).

Figure 3B:
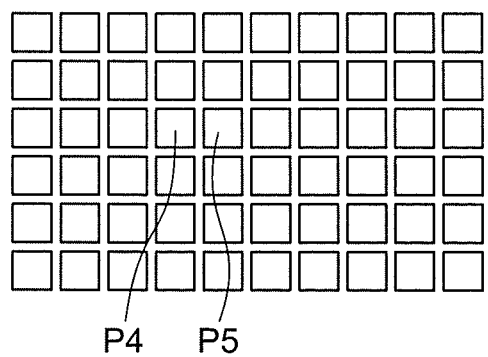

This difference $\Delta (p'4-p5)$ is equivalent to the difference between the output levels of pixels P4 and P5 when an image is captured by closing the correction shutter for uniform brightness (or temperature) as shown in FIG. 3(b). Therefore the present invention enables an output level difference $\Delta(p'4-p5)$ between the first and second pixels to be obtained without closing the correction shutter.

Figure 4:
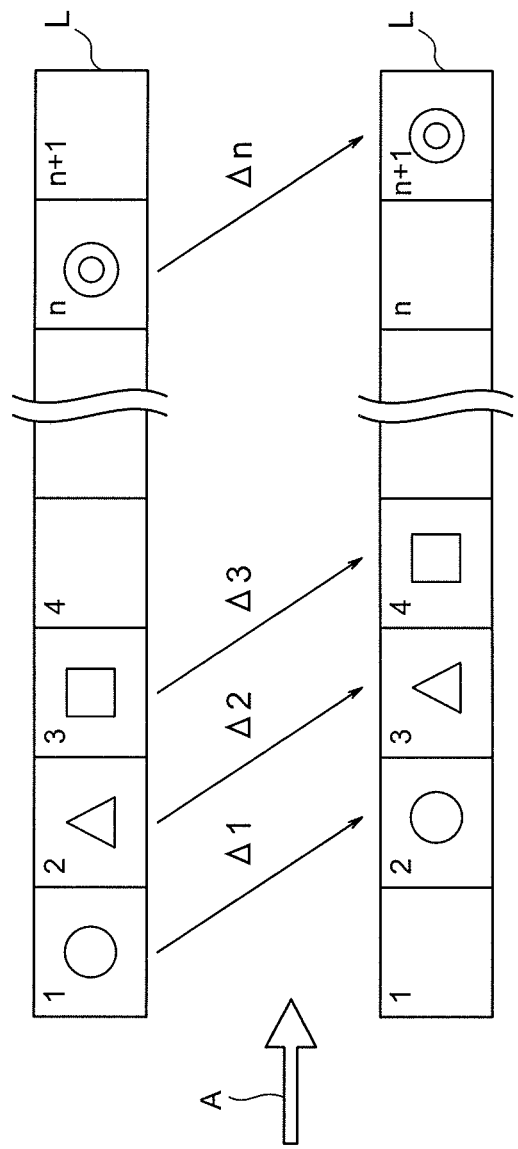
FIG. 4: A diagram showing the relationship between pixels in a pixel line and the light receiving part of an image, before and after moving the image position by one pixel pitch.

Referring to FIG. 4. we further explain the details of calculating the difference in output levels. FIG. 4 schematically shows one pixel line L on the light receiving surface 11. This pixel line L comprises the first pixel through the (n+1) pixel, arrayed in sequence from left to right. The top part of FIG. 4 schematically shows the part of an image for which light is received by each pixel in the pixel line L prior to movement of the image position. As shown in the top part of FIG. 4, the first pixel in the pixel line L receives light for the "○" portion of the image; the second pixel receives light for the "Δ" portion of the image; the third pixel receives light for the "□" portion of the image; similarly, the nth pixel receives light for the "⊙" part of the image.

The bottom part of FIG. 4 shows the part of the image for which light is received by each pixel in the pixel line L after movement of the image position by one pixel pitch in the direction of arrow A in FIG. 4 along the direction of orientation of pixels in the pixel line L. As shown in the bottom part of FIG. 4, the second pixel in the pixel line L receives light for the "○" portion of the image; the third pixel receives light for the "Δ" portion of the image; the fourth pixel receives light for the "□" portion of the image; similarly, the n+1 pixel receives light for the "⊙" part of the image.

As can be seen from FIG. 4, before and after movement of the image position the first and second pixels receive light for the "○" portion of the image; the second and third pixels receive light for the "Δ" portion of the image; the third and fourth pixels receive light for the "□" portion of the image; similarly, the n and n+1 pixels receive light for the "⊙" part of the image.

The result obtained by subtracting the pre-image position movement pixel output level from the post-image position movement pixel output level is used as the differential. Specifically, the output level of the first pixel prior to movement is subtracted from the output level of the second pixel after movement to calculate a difference $\Delta 1$; the output level of the second pixel prior to movement is subtracted from the output level of the third pixel after movement to calculate a difference $\Delta 2$; the output level of the third pixel prior to movement is subtracted from the output level of the fourth pixel after movement to calculate a difference $\Delta 3$; similarly, the output level of the nth pixel prior to movement is subtracted from the output level of the (n+1) pixel after movement to calculate a difference $\Delta n$.

Next, an offset amount calculating section 132 in the image processing section 13 sequentially adds the differences in output levels for the pixel lines arrayed in the direction of movement of the image position to calculate offset amounts in the output levels of pixels in the pixel line (S207). Here the result obtained by subtracting the pre-image position movement pixel output level from the post-image position movement pixel output level is used as the differential. In such cases, differences relative to a pixel line arrayed along the direction of movement of the image position are sequentially added in the direction of movement of the image position relative to the light receiving surface. The shift amounts of individual pixels in the pixel line are calculated as a total of the differences from the beginning of the addition up to the relevant pixel.

Note that the result obtained by subtracting a post-image position movement pixel output level from a pre-image position movement pixel output level may also be used for the differential. In such cases, it is desirable for differences relative to a pixel line arrayed along the direction of movement of the image position to be sequentially added facing in the direction opposite the direction of movement of the image position relative to the light receiving surface. The shift amounts for individual pixels in a pixel line are calculated by totaling the differences from the beginning of the addition to the subject pixel.

Figure 5:
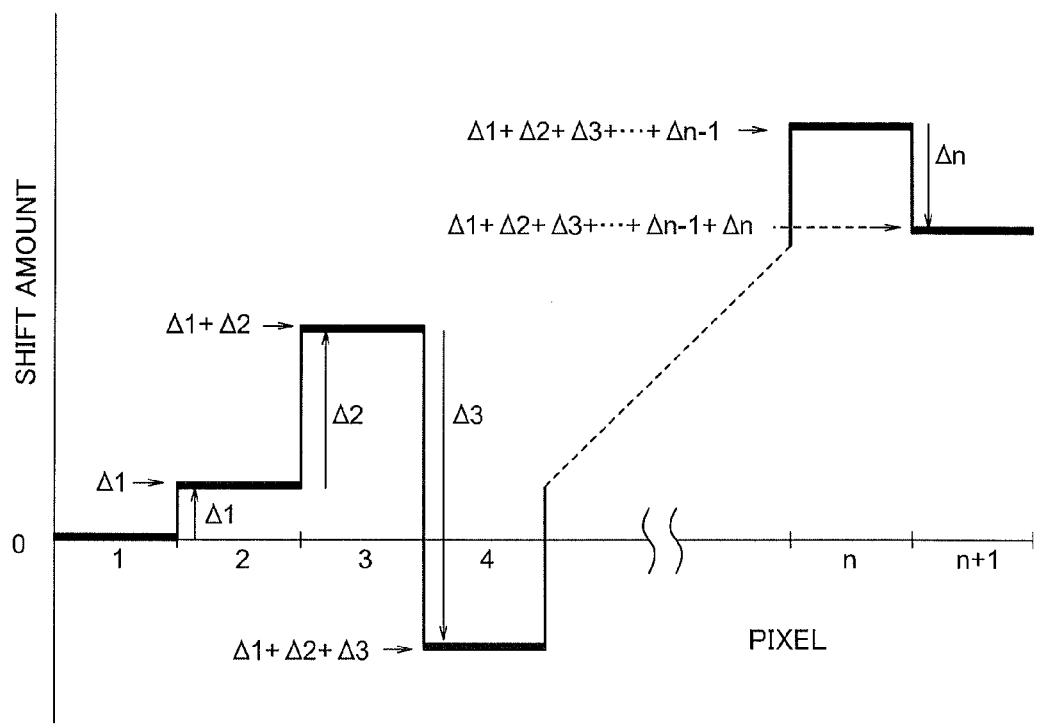
FIG. 5: A diagram showing the amount of shift in pixel output level on a pixel line.

In the example shown in FIG. 4, for each pixel in pixel line L, differentials $\Delta 1, \Delta 2, \Delta 3 \ldots \Delta n$ are sequentially added for each pixel, from the left edge of the pixel line to that pixel, are added in sequence along the direction of movement of the image position shown by arrow A, and that pixel output level shift amount is calculated. I.e., assuming a first pixel shift amount of 0, the shift amount is calculated to be $\Delta 1$ for the second pixel shift amount, $(\Delta 1+\Delta 2)$ for the third pixel shift amount, and similarly $(\Delta 1+\Delta 2+\Delta 3+ \ldots +\Delta n)$ for the n+1st pixel shift amount. Here the amount of shift by each pixel is shown in FIG. 5. FIG. 5 depicts pixels on the horizontal axis and shift amount on the vertical axis. In FIG. 5, the amount of shift by each pixel is shown as a shift amount referenced against the first pixel output level.

Note that the shift amount obtained by adding the differentials per pixel in the pixel line represents the shift amount relative to the output level of the pixel which became the starting point for the addition of differentials in that pixel line; it does not represent the absolute output levels of each pixel. However, the variability in output levels between pixels in a pixel line is due to the shift amounts in the relative output levels between pixels. Therefore even if the calculated shift amounts for each pixel do not represent absolute output levels, this does not raise a major problem from the standpoint of equalizing output levels between pixels in a pixel line.

Next, a correcting section 133 of the image processing section 13 corrects the output levels of each pixel based on the amount of offset to pixels in the pixel line so as to equalize variability between pixels in a pixel line (S208). When performing this correction it is desirable to subtract the amount of shifting of each pixel shown in FIG. 5, as is, from the output levels of each pixel to equalize the variability in output levels between pixels. In such cases, output levels of each pixel are made uniform with the first pixel output level. It is also acceptable to calculate an average value for the amount of shift in each pixel in a pixel line and to subtract the difference between this average value and the amount of shift in each pixel from the output level of each pixel. In that case the output level of each pixel is made uniform with the average value of the pixel line.

It is also acceptable when correcting to make a correction by locally equalizing variability in output levels of pixels in only one region of the light receiving surface 11, for example. It is also acceptable to increase or decrease output levels of pixels in the entire light receiving surface 11 so that the maximum value of the pixel output level is a predetermined value.

Note that the method by which the correcting section 133 equalizes variability in output levels between pixels is not limited to the method above; the correcting section 133 may use various methods.

Variability in output levels between pixels can in this way be equalized without closing a correction shutter. The reduction in variability in output levels between pixels allows for improvement in the recognition and profile extraction accuracy of objects with small differences in brightness.

First Second Example

Next we discuss a second operating example of an image capturing device of the present embodiment. The second operating example is basically expressed by the flow chart for the first operating example shown in FIG. 2. However, in the second operating example the image position moves by two pixel pitches in the direction of pixel orientation on the light receiving surface 11.

Figure 6:
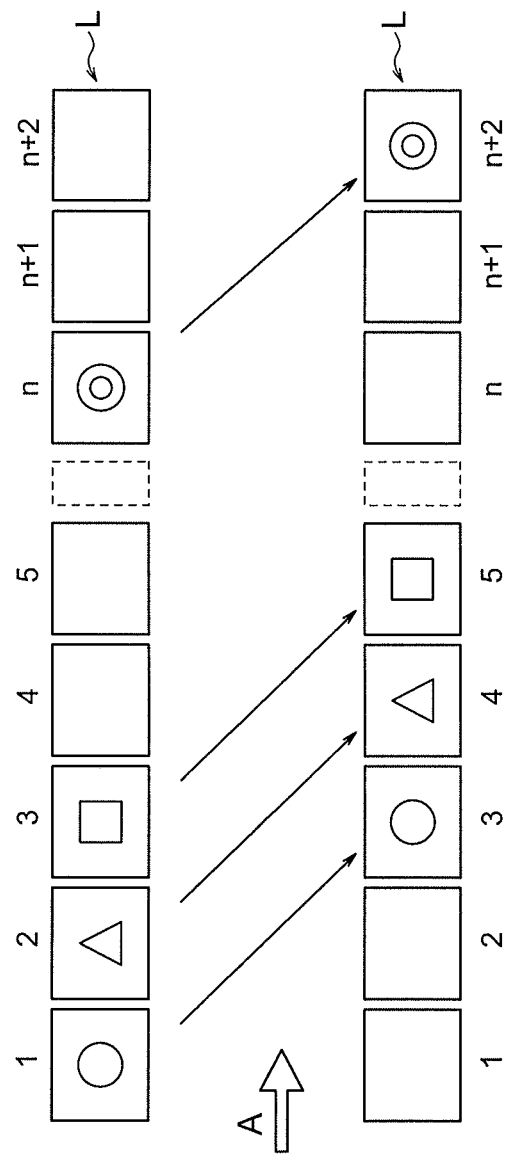
FIG. 6: A diagram showing the relationship between pixels in a pixel line and the light receiving part of an image, before and after moving the image position by two pixel pitches.

Here FIG. 6 schematically shows one pixel line L on the light receiving surface 11. This pixel line L comprises a first pixel through an (n+2) pixel, arrayed in sequence from left to right. The top part of FIG. 6 schematically shows the part of the image for which light is received by each pixel in the pixel line L prior to movement of the image position. As shown in the top part of FIG. 6, the first pixel in the pixel line L receives light for the "○" portion of the image; the second pixel receives light for the "Δ" portion of the image; the third pixel receives light for the "□" portion of the image; similarly, the nth pixel receives light for the "⊙" part of the image.

The bottom part of FIG. 6 shows the part of the image for which light is received by each pixel in the pixel line L after movement of the image position by two pixel pitches in the direction of arrow A in FIG. 6 along the direction of orientation of pixels in the pixel line L. As shown in the bottom part of FIG. 6, the third pixel in the pixel line L receives light for the "○" portion of the image; the fourth pixel receives light for the "Δ" portion of the image; the fifth pixel receives light for the "□" portion of the image; similarly, the n+2 pixel receives light for the "⊙" part of the image.

As can be seen from the top and bottom portions of FIG. 6, before and after movement of the image position the first and third pixels receive light for the "○" portion of the image; the third and fifth pixels receive light for the "Δ" portion of the image; the fifth and seventh pixels receive light for the "□" portion of the image; similarly, the n and n+2 pixels receive light for the "⊙" part of the image.

The result obtained by subtracting the pre-image position movement pixel output level from the post-image position movement pixel output level is used as the differential. Specifically, the output level of the third pixel prior to movement is subtracted from the output level of the third pixel after movement to calculate a difference $\Delta 2$; the output level of the third pixel prior to movement is subtracted from the output level of the fourth pixel after movement to calculate a difference $\Delta 3$; similarly, the output level of the nth pixel prior to movement is subtracted from the output level of the (n+1)th pixel after movement to calculate a difference $\Delta n$.

Next, an offset amount calculating section 132 in the image processing section 13 adds the difference in output levels for the pixel line arrayed in the direction of image position movement for each two pixels, in order starting with the first pixel, to calculate an offset amount to the output levels of pixels in the pixel line, and further performs additions of each two pixels in order starting from the second pixel, calculating an offset amount for the output levels of the remaining pixels (S207). Here, the result obtained by subtracting the pre-image position movement pixel output level from the post-image position movement pixel output level is used as the differential. In such cases, differences relative to a pixel line arrayed along the direction of movement of the image position are sequentially added in the direction of movement of the image position relative to the light receiving surface. The shift amounts of individual pixels in the pixel line are calculated as a total of the differences from the beginning of the addition up to the relevant pixel.

Note that individual pixel offset amounts can also be calculated when the image position has moved in the direction of pixel alignment by N pixel pitches, equal to or greater than 3 pixel pitches on the light receiving surface 11, just as when it has moved by two pixel pitches. In such cases, a differential $\Delta n$ is first calculated by subtracting the output level of the nth pixel prior to movement from the output level of the (n+N)th pixel after movement. Next, the differentials in each N pixels are sequentially added, using each pixel from the first to the Nth pixel in the pixel line as a starting point. This enables the offset amount of each pixel to be calculated.

Next, the correcting section 133 of the image processing section 13 corrects the output levels of each pixel based on the amount of offset to pixels in the pixel line so as to equalize the variability between pixels in the pixel line.

Third Operating Example

Figure 7:
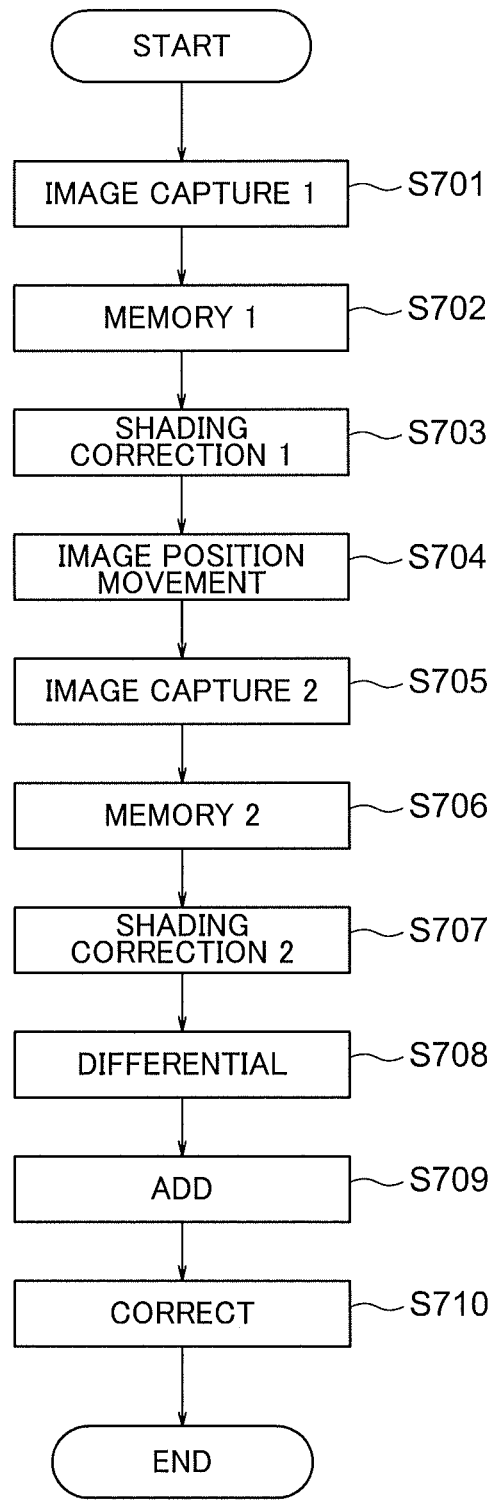
FIG. 7: A flow chart explaining a third operating example of an image capture device according to an embodiment of the present invention.

Next, referring to the FIG. 7 flow chart, we discuss a third operating example of the image capture device according to an embodiment. The third operating example is the same as the first operating example shown in FIG. 2, except for the addition of the "shading correction 1" (S702) and "shading correction 2" (S707) steps.

In general, infrared image capture devices are affected by shading. Shading refers to the phenomenon in an infrared image capture device whereby, owing to internal surface radiation and stray light inside the image capture device unrelated to the object, the amount of infrared light received by image capturing elements on the light-receiving surface increases from the center portion toward the peripheral portion of the light-receiving surface when ambient temperature is high, and declines from the center portion toward the peripheral portion of the light-receiving surface when ambient temperature is low.

Figure 8A:
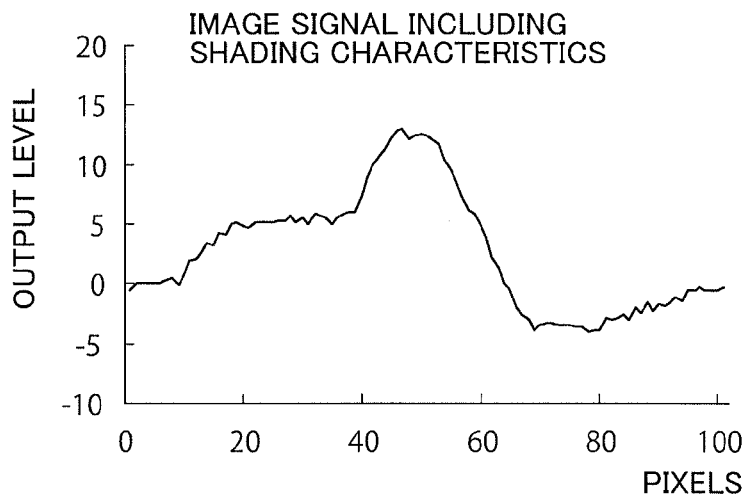
FIG. 8: (*a*): a graph showing an image signal including shading characteristics; (*b*): a graph showing shading characteristics; (*c*): a graph showing an image signal in which shading characteristics are corrected.

FIG. 8(a) shows an example of image signal output levels including shading characteristics. The horizontal axis of the graph in FIG. 8(a) shows a pixel line pixel traversing the center of the light-receiving surface, whereas the vertical axis shows the output levels of each pixel. Therefore the center portion of the horizontal axis corresponds to the center portion of the light-receiving surface, and the peripheral portion of the horizontal axis corresponds to the peripheral portion of the light-receiving surface. The output level of an image signal containing shading characteristics, shown by line I, exhibits an overall trend whereby the output level in the peripheral portion of the light-receiving surface is lower than the output level at the center portion.

Figure 8B:
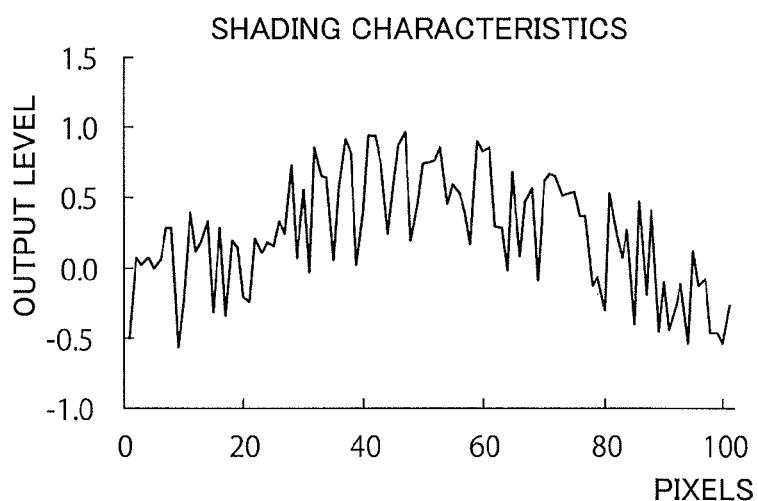

FIG. 8(b) shows an example of shading characteristics. As shown by the curve II at the center of FIG. 8(b), in the image capture device 1 of the embodiment, the output level is at a maximum at the center portion of the light-receiving surface and declines going toward the peripheral portion of the light-receiving surface. It is desirable to obtain such shading characteristics by pre-imaging a uniform planar heat source. It is desirable, for example, to store the amounts or rates of decrease to the output levels of pixels in the peripheral portion of the light-receiving surface relative to output levels of pixels at the center portion thereof in memory, not shown, in memory locations corresponding to the positions of pixels on the light-receiving surface. Storage in memory may also take the form of a reference table in which shading characteristics are correlated to the temperature of the image capture device 1.

In operating example 3, output levels of each pixel prior to image position movement stored in the first memory are shading-corrected to offset the effect of shading, using shading characteristics stored in memory. Also, output levels of each pixel prior to image position movement stored in the second memory are shading-corrected to offset the effect of shading, using shading characteristics stored in memory. Specifically, the reduction amount stored per pixel may be added to pixel output levels, or the output levels of each pixel may be divided by the rate of decrease stored per pixel.

Figure 8C:
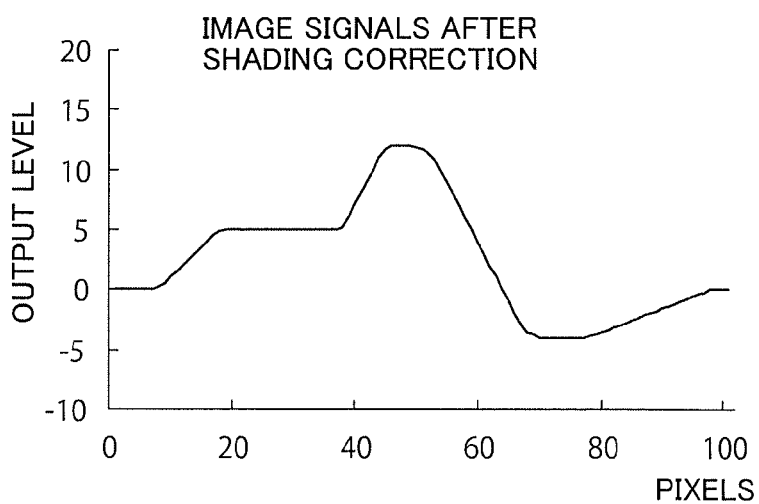

FIG. 8(c) shows an example of the output levels of image signals subjected to shading correction as described above. As shown by line III, when compared to the curve I in FIG. 8(a) the output level of the image signal after shading correction rises at the peripheral portions, and it can be seen that the effect of shading characteristics is removed.

Note that in the flow chart shown in FIG. 7, shading correction was performed on the output levels temporarily stored in the first and second memories, respectively, but pixel output levels may also be directly stored in memory after shading correction.

Separate from the correction of shading characteristics, it is also acceptable to move into a region (OverNear, OverInf) where the optics 21 is purposely not focused or zoomed in order to correct the initial variability in output levels between pixels in the image capture device 1. In this state, the image on the light-receiving surface has a substantially uniform brightness or infrared intensity. It is also acceptable by capturing this uniform image to correct the output levels of each pixel so that variability in output levels between pixels on the light-receiving surface is made uniform.

Fourth Operating Example

Figure 9:
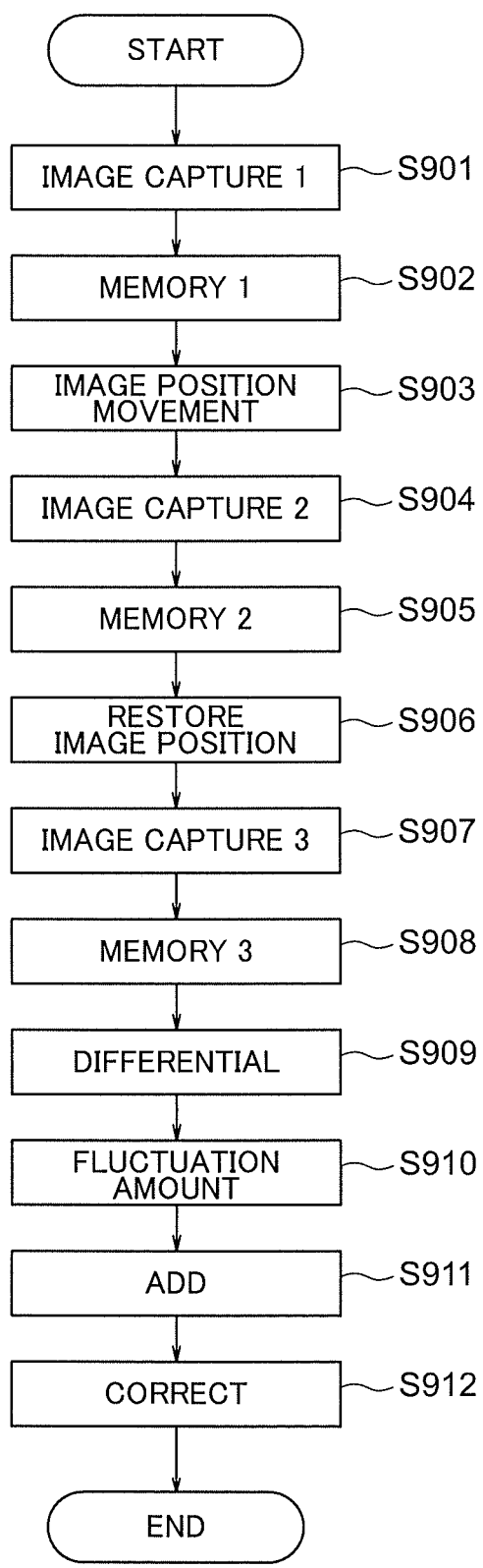
FIG. 9: A flow chart explaining a fourth operating example of an image capture device according to an embodiment of the present invention.

Next, referring to the FIG. 9 flow chart, we discuss a fourth operating example of the image capture device according to an embodiment. The fourth operating example is the same as the above-described first operating example up until the step (S904), in which the image on the light-receiving surface is captured after movement of the image position, and the output levels of each pixel are stored in the second memory (S905).

In the fifth operating example, after moving the image position the image shifting means 22 once again returns the image position to its pre-movement position (S906). Here the image on the light receiving surface 11 prior to image position movement is shown in the upper part of FIG. 10, the image on the light receiving surface 11 after image position movement is shown in the center part of FIG. 10, and the image after the image position is returned is shown in the bottom part of FIG. 10. The figures shown in the top and middle parts of FIG. 10 correspond to the figures shown in the top and bottom part of FIG. 3(a).

Next, the image capturing means 12 re-captures the image on the light-receiving surface after the image position is returned (S907), storing the output levels of each pixel in the captured image in the third image memory (S908). The third image memory is provided in the camera body 10.

Next, as in the above-described first operating example step (S206), a differential calculating section 131 of the image processing section 13 reads out the pre-image position movement pixel output levels stored in the first memory, and reads out the pre-image position movement pixel output levels stored in the second memory, calculating the difference in output levels for pixels receiving light for the respective same portions on the light receiving surface 11 before and after image movement (S909).

Next, the image processing section 13 reads out the pixel output level prior to image position movement, stored in the first pixel memory, and the pixel output level after the image position is returned, stored in the third pixel memory, and computes the amount of fluctuation in output levels between the same pixels before and after movement of the image position (S910).

Figure 10:
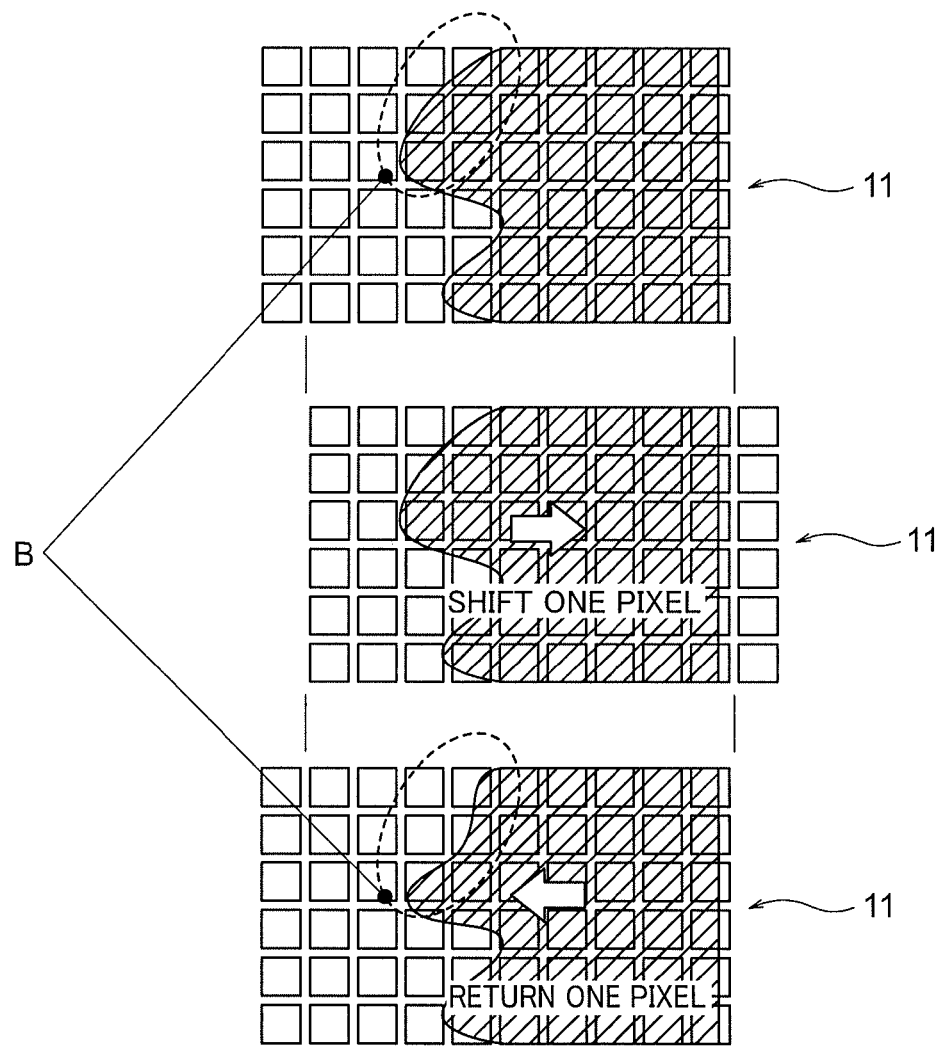
FIG. 10: A graph showing the positional relationship between a screen and an image before and after moving an image position, and after restoring the image position.

Comparing images on the light receiving surface 11 in the top and bottom parts of FIG. 10, the image in the portion surrounded by dotted line B has changed. Such changes in image occur due to movement of an object, for example. The differential in pixel output levels in such portions does not accurately reflect the differences in output levels stemming from variations in output characteristics of the pixels themselves. The pixels in the portion surrounded by dotted line B show values at which the amount of variability is high.

In the fourth operating example, an offset amount calculating section 132 performs addition by excluding pixel differentials with a change amount equal to or greater than a predetermined reference value, and calculates an offset amount (S911). For example, if the amount of variability in pixels midway on a pixel line is equal to or greater than a reference value, it is desirable to obtain an offset by adding only the differentials up to the pixel before the pixel for which the amount of fluctuation is equal to or greater than the reference value. Offset amounts in this way be prevented from becoming inaccurate.

Note that the reference value can be set to a desired favorable value according to the environment in which the image capture device 1 is used.

Fifth Operating Example

Figure 11:
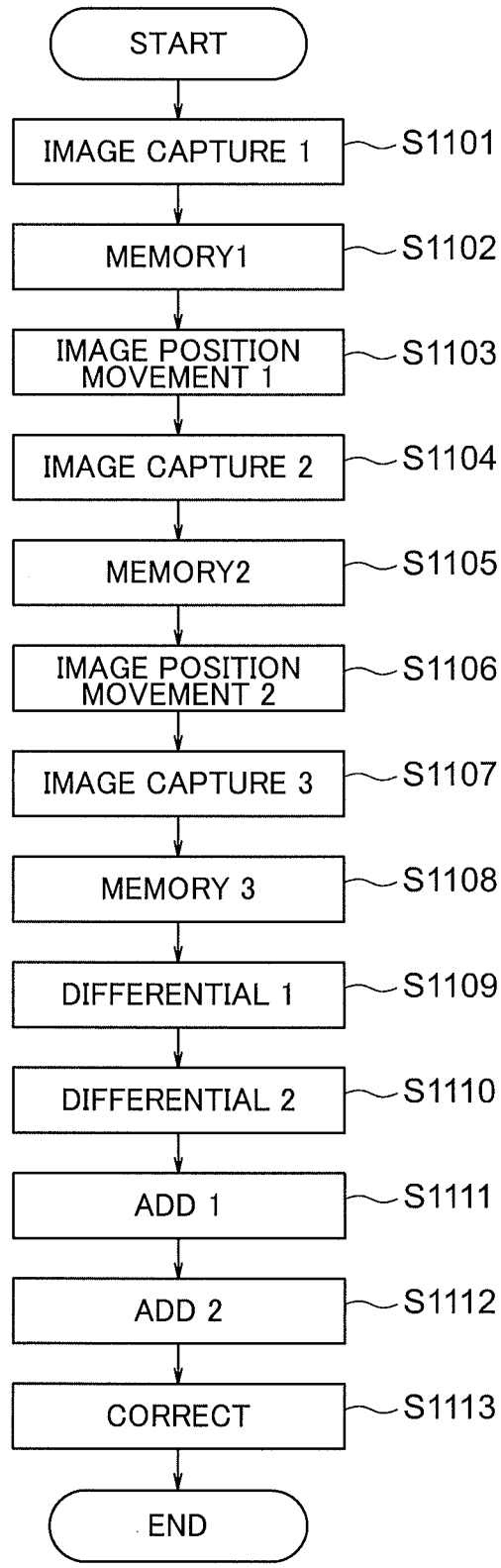
FIG. 11: A flow chart explaining a fifth operating example of an image capture device according to an embodiment of the present invention.

Next, referring to the FIG. 11 flow chart, we discuss a fifth operating example of the image capture device according to an embodiment. The fifth operating example is substantially the same as the above-described first operating example up until the image on the light-receiving surface is captured after movement of the image position (S1104) and the output levels of each pixel are stored in the second memory (S1105).

Figure 12:
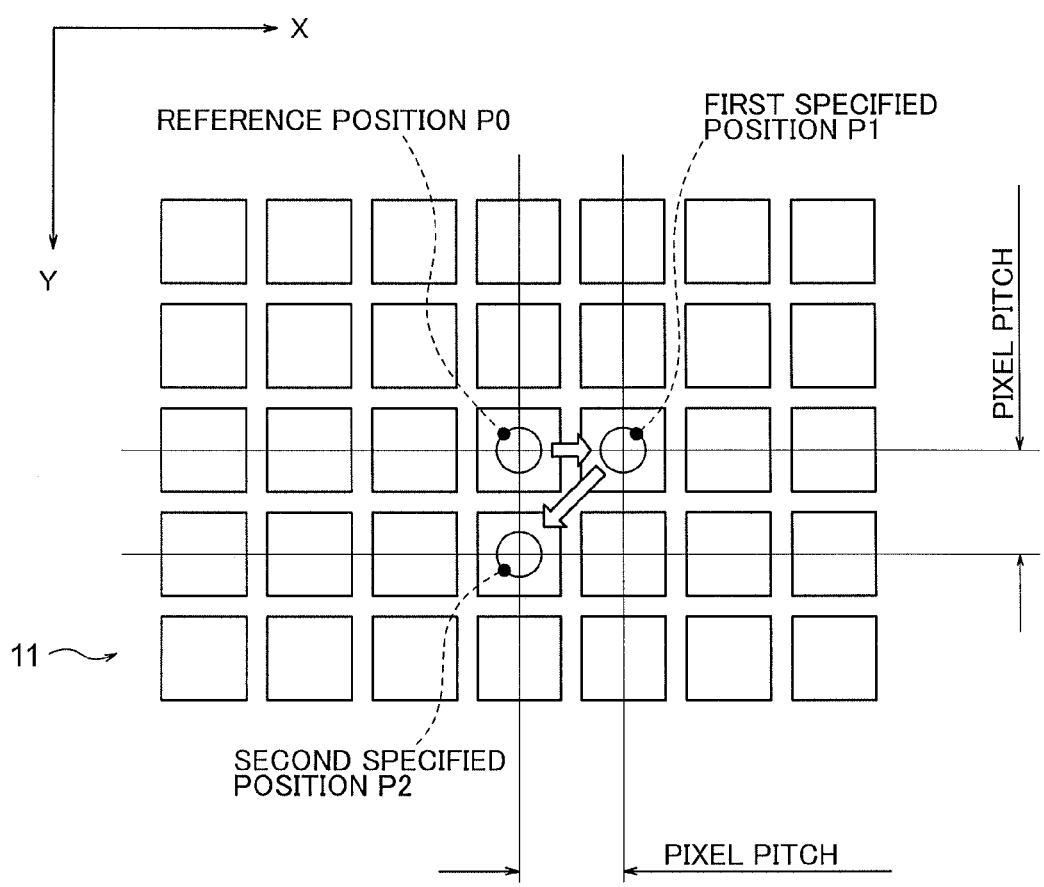
FIG. 12: A diagram showing the relationship between the layout of pixels on a light-receiving surface and the direction of movement of an image position.

Here, referring to FIG. 12, we discuss the relationship between the arraying of pixels on the light receiving surface 11 and the direction of movement of the image position. A two dimensional matrix in mutually perpendicular X and Y directions is arrayed on the light receiving surface 11 shown in FIG. 12. Prior to movement of the image position, the "○" portion of the image is positioned on pixel P0 at a reference position. At this point, an image prior to movement on the light receiving surface 11 is captured (S1101), and the output levels of each of the pixels constituting the light receiving surface 11 are stored in the first memory (S1102).

Next, a first image movement is implemented (S1103) in order to move the "○" portion of the image in the X direction by one pixel pitch, from reference position pixel P0 to a first specified position pixel P1. As a result, the "○" in the image is positioned on first specified position P1.

Next, after the first movement, the post-movement image on the light receiving surface 11 is captured (S1104) and the output levels of each of the pixels constituting the light receiving surface 11 are stored in the second memory (S1105).

Next, a second image movement is conducted (S1106) so that the "○" portion of the image is moved diagonally to the left and downward from a pixel P1 at a first specified position by the square root of one pixel (multiply by $\sqrt{2}$). As a result, the "○" in the image is positioned at a second specified position P2. As a result of the first and second movements, the "○" portion of the image is moved in the Y direction by one pixel pitch, from reference position pixel P0 to a second specified position pixel P2.

Next, after the second movement, the post-movement image on the light receiving surface 11 is captured (S1107) and the output levels of each of the pixels constituting the light receiving surface 11 are stored in the third memory (S1108).

Next, the output levels stored in the first and second memories are read out, and for adjacent pixels respectively receiving light for the same portion before and after the first movement in the pixel line aligned in the X direction of the light receiving surface 11, the differentials in output levels before and after the first movement are respectively calculated as the first differentials (S1109). Note that first differentials are calculated for each of the pixel lines aligned in the X direction on the light receiving surface 11.

Next, the output levels stored in the first and third memories are read out and for adjacent pixels respectively receiving light for the same portion before the first movement and after the second movement in the pixel line aligned in the Y direction of the light receiving surface 11, the differentials in output levels before the first movement and after the second movement are respectively calculated as the second differential (S1110). Note that a second differential is calculated for each of the pixel lines arrayed in the Y direction on the light receiving surface 11.

Next, with respect to pixel lines arrayed in the X direction, output level first differentials are added up in sequence and a first offset amount for each pixel in pixel lines arrayed in the X direction is calculated (S1111). Note that a first offset amount is calculated for each of the pixel lines arrayed in the X direction on the light receiving surface 11.

Next, with respect to the pixel rows arrayed in the Y direction, output level second differentials are added up in sequence to calculate a second offset amount for each pixel in pixel lines arrayed in the Y direction (S1112). Note that a second offset amount is calculated for each of the pixel lines arrayed in the Y direction on the light receiving surface 11.

Next, the output levels of each pixel on the light receiving surface 11 are corrected (S1113) based on the amount of the first and second offsets. Any desired favorable method may be adopted for correcting the output levels of each pixel. For example, each of the pixels may be corrected to equalize output levels after calculating averages of first and second offset amounts as output level offsets for each pixel. Or, for example, it is also acceptable for each pixel to use as the output level following equalization of the output levels of each pixel an averaged value of an output level equalizing the output levels of pixel lines in the X direction and an output level equalizing the output levels of pixel lines in the Y direction.

A more accurate correction can thus be achieved, since pixel output levels are corrected based on first and second offset amounts respectively calculated for the X and Y directions.

(additive values $m,n$)={(additive values $m-1,n$)+(first differential values $m,n$)+(additive values $m,n-1$)+ (second differential values $m,n$)}/2

Note that if (first differential values m, n) cannot be obtained, it is acceptable to adopt:

(additive values $m,n$)=(additive values $m,n-1$)+(second differential value $m,n$).

Note that if (second differential values m, n) cannot be obtained, it is acceptable to adopt:

(additive values $m,n$)=(additive values $m-1,n$)+(first differential value $m,n$).

Figure 13:
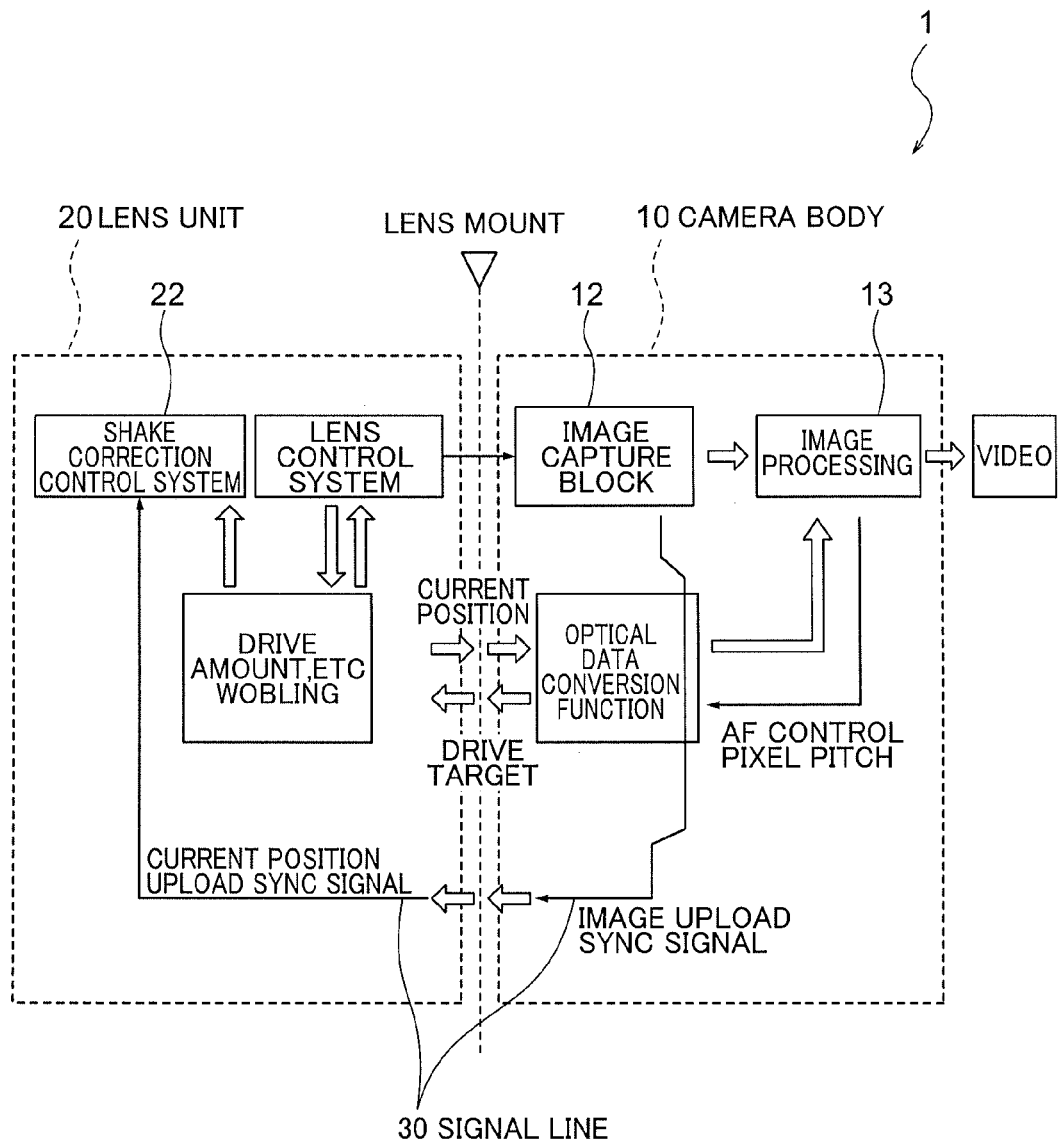
FIG. 13: A diagram explaining data transfer between a camera body 10 and a lens unit 20.
Figure 14:
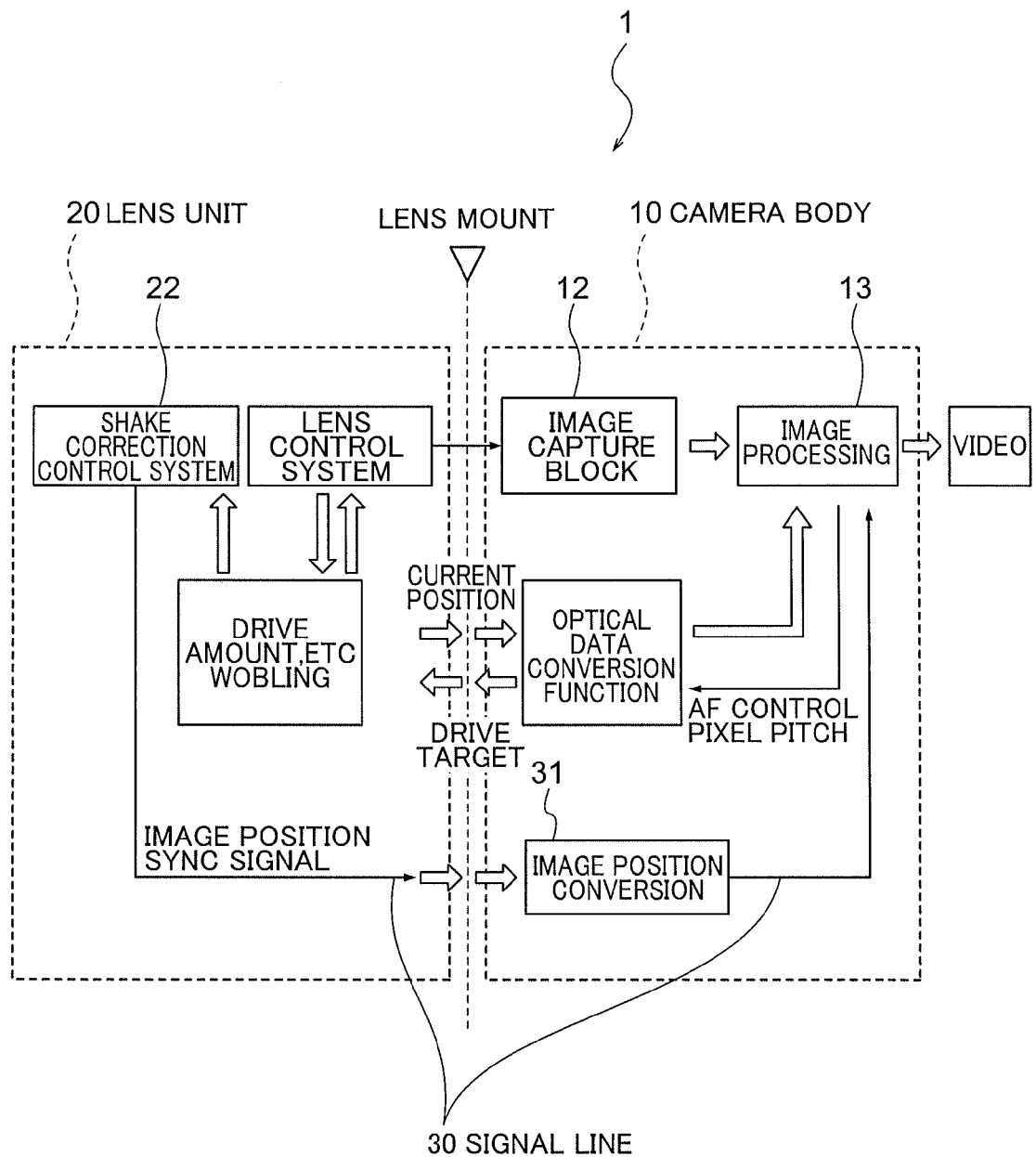
FIG. 14: A diagram explaining data transfer between a camera body 10 and a lens unit 20.

Next, referring to FIGS. 13 and 14, we discuss the transfer of data between camera body 10 and lens unit 20.

In FIG. 13 and FIG. 14, the image capture block of the camera body 10 corresponds to the image capturing means 12 in FIG. 1, and the image processing block corresponds to the image processing means 13 in FIG. 1. In FIGS. 13 and 14, the blur-correction control system block in the lens unit 20 corresponds to the image shifting means 22 in FIG. 1. Note that the lens unit 20 lens control system block represents the function controlling focusing, zooming, and the like of the lens system.

In the image capture device 1 of the embodiment, a blur correction control mechanism may be utilized as the image shifting means 22. However, whereas in a normal blur correction control mechanism blur correction control is performed to cancel out movement of the image capture device 1, the image shifting means 22 is controlled so that the image position moves by a predetermined amount in a predetermined direction relative to the light-receiving surface.

If the lens unit 20 is an interchangeable lens attachable to multiple types of camera main bodies, pixel pitch and the like may differ from one camera body to another. It is therefore sometimes necessary for the camera body 10 to instruct the lens unit 20 with an amount by which the image shifting means 22 is to move the image position. Furthermore, because images on the light-receiving surface are respectively captured before and after movement of the image position by the image shifting means 22, it is necessary to control image capture timing and the timing at which the image position is moved.

Therefore in the image capture device 1 shown in FIGS. 13 and 14, data including inter-pixel spacing is output from the image processing section 13 in the camera body 10 to the lens unit 20 as an optical data conversion function. The lens unit 20 determines the amount driven by image shifting means 22 based on the optical data conversion function input from the camera body 10, and moves the image position.

If, for example, the pixel pitch on the light receiving surface of the image block 12 in the camera body 10 is 20 μm, then data instructing that the pixel pitch is 20 μm is sent from the camera body 10 to the lens unit 20. When the fraction of the amount of image position movement relative to the amount of drive of the lens unit 20 blur correction control system (correction optics)—i.e. the correction optics efficiency is 0.8, the amount of drive of the blur correction control system per pitch is calculated as 20÷0.8=25 (μm). The image position on the light-receiving surface moves a 20 μm single pixel pitch as the result of the 25 μm driving of the blur correction control system. It is thus possible to move the image in pixel units matching the pitch of the pixels in the light-receiving surface in the image block 12 of the camera body 10.

In the image capture device 1 shown in FIG. 13, the image capture block 12 in the camera body 10 and the blur correction control system (shake correction control system) 22 in the lens unit 20 are connected by the signal line 30. The image capture block 12 outputs a sync signal for syncing the timing at which an image on the light-receiving surface is captured. I.e., the signal line 30 is enabled (made valid) at the time of image capture. This sync signal is transferred to the blur correction control system 22 through a signal line 30. The blur correction control system 22 moves the image position based on the sync signal. Timing of the image position movement can thus be matched to that of image capture.

In the image capture device 1 shown in FIG. 14, the blur correction control system 22 in the lens unit 20 and the image processing section 13 in the camera body 10 are connected by a signal line 30 through an image position conversion block 31. The blur correction control system 22 outputs a sync signal synced to the timing at which the image position is moved. I.e., the signal line 30 is enabled at the timing at which the blur correction control system 22 is driven. This sync signal is transferred to the image processing block 13 via the image position conversion block 31 over signal line 30. For example, the blur correction control system 22 outputs a sync signal at the same time as the blur correction control system 22 drives a predetermined drive amount to move the image position to a predetermined position.

The drive amount and drive direction are also output by the blur correction control system 22 together with this sync signal, and the amount of drive is converted by the image position conversion block 31 to a pixel pitch count corresponding to the amount of image position movement. The image capture block 12 captures images on the light-receiving surface based on the sync signal. Continuing, it is desirable for the image processing block 13 to calculate the differential between pixels separated by a pixel pitch count corresponding to the amount of movement in the image movement direction. Accurate correction can thus be achieved by matching the image position movement and image capture timing.

Sixth Operating Example

Figure 15A:
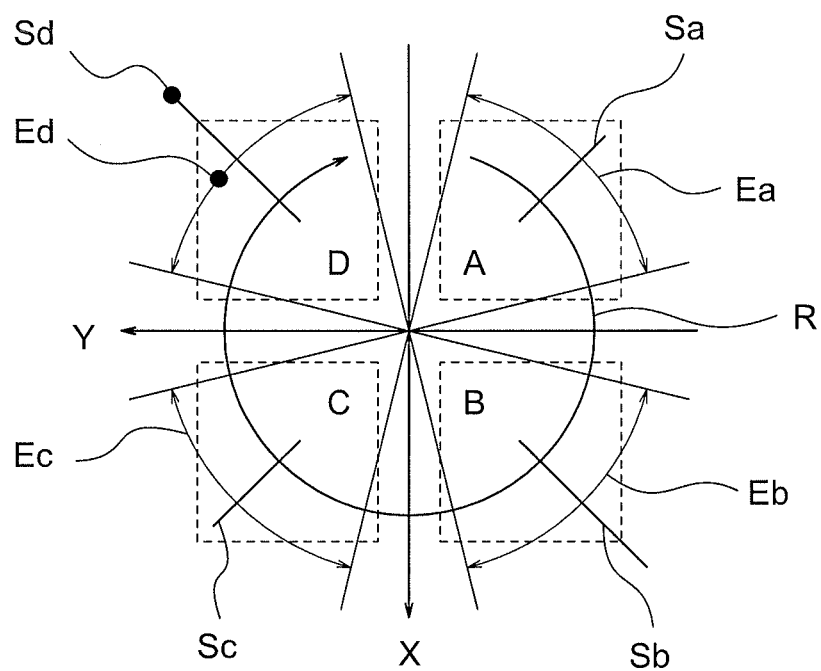
FIGS. 15: (*a*) and (*b*): diagrams showing the track when an image is moved in a uniform velocity circular orbit on a light-receiving surface.

Next, referring to FIG. 15, we discuss a sixth operating example of the image capture device according to an embodiment. FIGS. 15(a) and (b) are expanded diagrams of the four pixels A through D, adjacent and two-dimensionally arrayed, among the pixels constituting the light receiving surface 11.

In the sixth operating example, the image shifting means 22 translationally moves the image position on the light receiving surface 11 so that, as shown in FIG. 15(a), the track of a desired point on the light receiving surface 11 (the "image point" below) describes a circular orbit R on the light receiving surface 11. As shown in FIG. 15(a), the image position moves so that the image point on the light receiving surface 11 makes a continuous constant velocity circular movement. The radius of this circular orbit R may, for example, be $(1/\sqrt{2}) \times$ the pixel pitch.

Note that FIG. 15(a) shows only the four pixels A through D, but in the entirety of the light receiving surface 11 the image position is translationally moved so that the trajectories of each point of the entire image on the light receiving surface 11 simultaneously describe circular orbits.

Figure 16A:
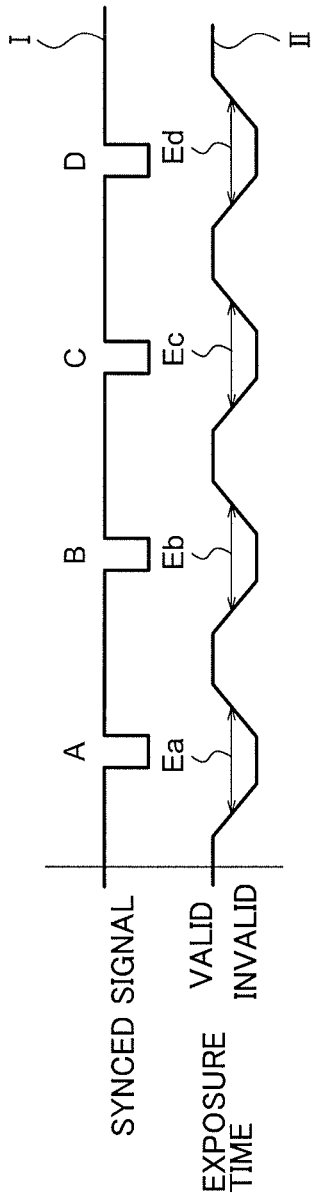
FIGS. 16: (*a*) and (*b*): timing charts showing the relationship between the sync signal and exposure time.

Referring to the timing chart in FIG. 16(a), we discuss image capture timing. Line I in FIG. 16(a) depicts the timing of a sync signal, and line II depicts pixel light exposure time. These exposure periods Ea, Eb, Ec, and Ed also correspond to the period in which the image point in FIG. 15(a) is positioned in section Ea on pixel A, section Eb on pixel B, section Ec on pixel C, and section Ed on pixel D within the circular orbit R.

Sync signals A, B, C, and D are output from the image shifting means 22 at the centers of the FIG. 16(a) exposure periods Ea, Eb, Ec, and Ed. As a result, images are captured on the light-receiving surface when the image point is positioned at the center positions Sa, Sb, Sc, and Sd of the FIG. 15(a) sections Ea, Eb, Ec, and Ed.

Figure 16B:
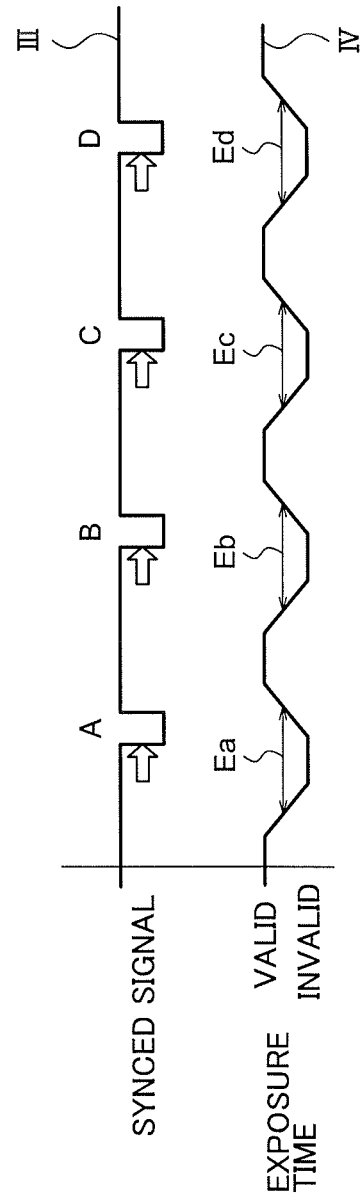

Note that a delay time occurs from the time the sync signals A, B, C, and D are output until actual image capture takes place. Considering this delay time, it is also acceptable to delay the output timing of sync signals A, B, C, and D by a predetermined time from the middle of the respective exposure periods relative to the exposure periods Ea, Eb, Ec, and Ed indicated by line IV, as shown by line III in FIG. 16(b).

Figure 17:
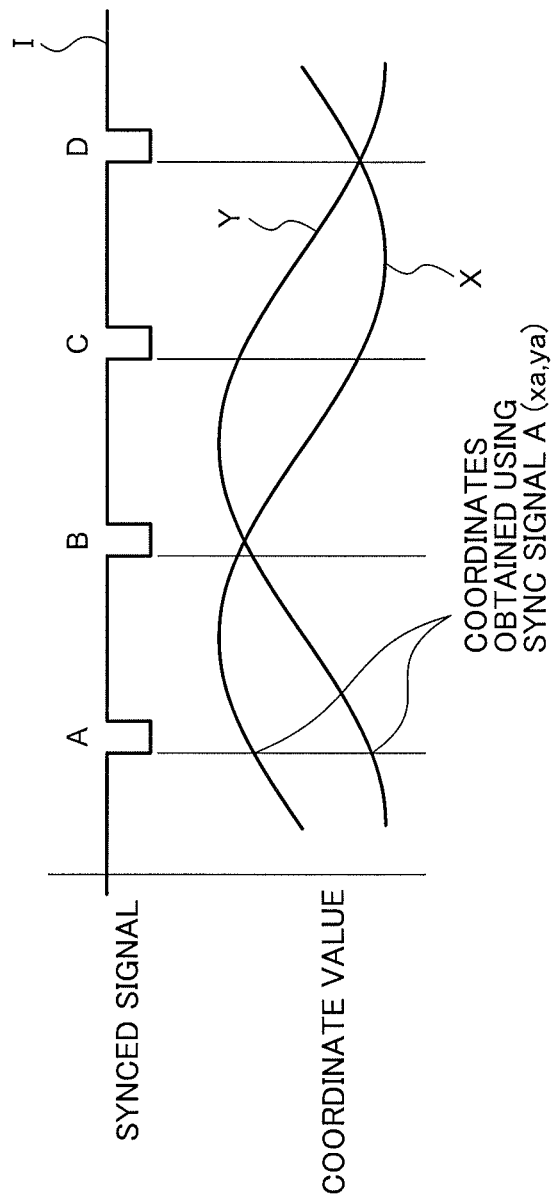
FIG. 17: a timing chart showing the relationship between sync signal and image position.

It is desirable for the image processing block 13 to output the position of the image point to the camera body 10 together with the sync signal. It is desirable for the position of the image point to be expressed by XY coordinates using the center of the four pixels A through D as origin, as shown in FIG. 15(a). Here we show the relationship between the sync signal in the FIG. 17 timing chart and the image point coordinates. Line I in FIG. 17 shows the timing of the sync signal; curves X and Y respectively show the image point X and Y coordinates. Coordinates (xa, ya) of the image point on the pixel A at that time are obtained at the output timing of the sync signal A shown by line I. These coordinates are output to the camera body 10.

Note that when the image position moves for the purpose of blur correction, it is desirable to output a value for the image point coordinate from which the amount of image movement by blur correction is subtracted.

Figure 15B:
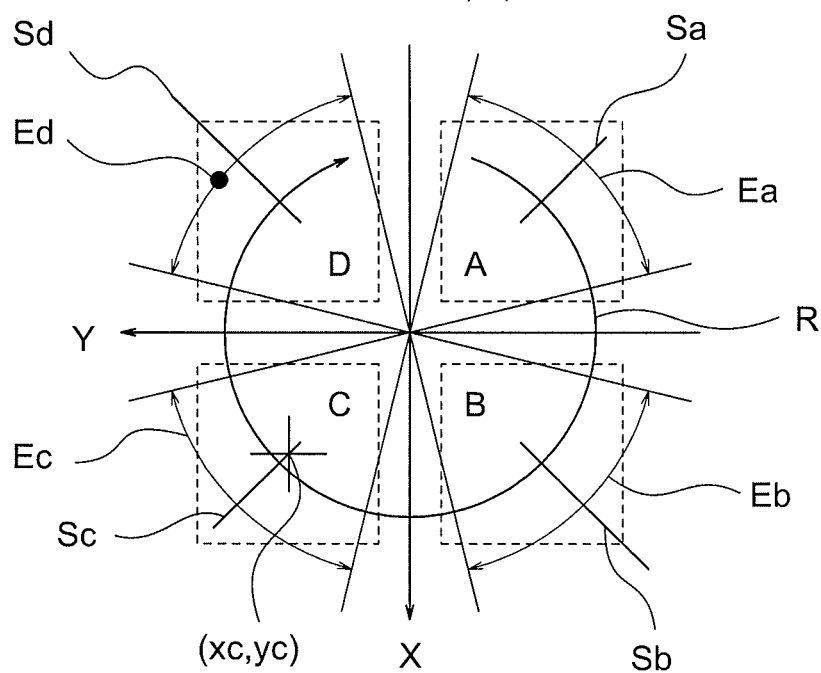

Image point positions may be represented as the coordinates of the respective average values of the sections Ea, Eb, Ec, and Ed on the circular orbit R on each pixel. For example, the coordinates (xc, yc) with the average value of section Ec on the pixel C in FIG. 15(b) are obtained by Equation (1) below.

$$\int (\text{coordinate}) \times (\text{existence time}) dt \div (\text{section } Ed \text{ existence time}) \tag{1}$$

The sixth operating example in which the image on the light receiving surface is captured at the image capture timing described above basically corresponds to the FIG. 11 flow chart in the fifth operating example, as described below.

First, the image capture means 12 captures respective images on the light receiving surface 11 before and after the image point moves over a predetermined part of the circular orbit R. Specifically, for capture of images prior to movement, an image on the light receiving surface 11 is first captured (FIG. 1, S1101) when the image point is positioned at the Sa point of the pixel A on the circular orbit R. The captured image is stored in the first memory (S1102).

Next, the image point moves on the circular orbit R from point Sa on pixel A to point Sb on pixel B (S1103). The image point makes a constant velocity circular movement on the circular orbit R, but the direction going from point Sa to point Sb is along the X direction. Therefore this movement direction is deemed the X direction.

Next, the image on the light receiving surface 11 is captured (S1104) when the image point is positioned on point Sb on pixel B on the circular orbit R. The captured image is stored in the second memory (S1105).

Continuing, the image point moves over circular orbit R from point Sb on pixel B to point Sc on pixel C (S1106). The image point make a constant velocity circular movement on the circular orbit R, but the direction going from point Sb to point Sc is along the Y direction. Therefore this movement direction is deemed the Y direction.

Next, the image on the light receiving surface 11 is captured (S1107) when the image point is positioned on point Sc on pixel C on the circular orbit R. The captured image is stored in the third memory (S1108).

Next, a calculation is made of the difference in output levels among pixels respectively receiving light for the same part of an image before and after the image point moves over a predetermined part on the circular orbit. Before and after movement in the X direction, pixels A and B receive light for the same image part. Over the entire light-receiving surface, adjacent pixels in the X direction respectively receive light for the same image part. Output levels for adjacent pixels in the X direction, stored in first and second memories, are thus read out and the differences in output levels of adjacent pixels before and after movement in the X direction are respectively calculated as the first differential (S1109).

Also, before and after movement in the Y direction, pixels B and C receive light for the same image part. Over the entire light-receiving surface, adjacent pixels in the Y direction respectively receive light for the same image part. Output levels for adjacent pixels in the X direction, stored in second and third memories, are thus read out and the differences in output levels of adjacent pixels before and after movement in the Y direction are respectively calculated as the second differential (S1110).

Next, first differentials are added up in sequence for the pixel rows arrayed in the X direction to calculate a first offset amount for each pixel in pixel lines arrayed in the X direction (S1111). Next, with respect to pixel lines arrayed in the Y direction, second differentials are added up in sequence and a second offset amount for each pixel in pixel lines arrayed in the Y direction is calculated (S1112).

Next, the output levels of each pixel on the light receiving surface 11 are corrected (S1113) based on the first and second offset amounts.

Thus in the sixth operating example, an image position can be continuously moved by moving the image position so as to cause its track to describe a circular orbit. It is therefore easy to attain positioning accuracy for the image position. Also, an image position can be stably moved by moving the image position to continuously implement a uniform velocity straight line movement. Corrections can also be easily implemented in each cycle of the circular movement of the image position.

In the image memory described above we discussed examples in which the present invention is constituted using particular conditions, but the present invention is not limited thereto, and various modifications and combinations of the present invention are possible. In the above-described embodiments we discussed an example of an image capture device wherein an image shifting means was incorporated into optics, but in the present invention the image shifting means is not limited thereto. The image shifting means may also be one which displaces the entire optics in a direction perpendicular to the optical axis thereof, and displaces the light-receiving surface of the image capture means in a direction perpendicular to the optical axis of the optics.

POTENTIAL INDUSTRIAL APPLICATIONS

The present invention may also be applied to an image capture device for capturing infrared images, or to an image capture device for capturing visible light images. The present invention is also favorably used in monitor cameras for which there is a requirement for uninterrupted image capture. The present invention may also be applied to line sensors having a light-receiving surface constituted by a single pixel line.

EXPLANATION OF REFERENCE NUMERALS

1: image capture device
10: camera body
11: light receiving surface
12: image capture means
13: image processing means
20: lens unit
21: optics
22: image shifting means
22a: lens
131: differential calculating section
132: offset amount calculating section
133: correcting section

The invention claimed is:
1. An image capture device comprising:
an image capturing means having a light-receiving surface, on which are arrayed pixels composed of image capturing elements for outputting electrical signals at output levels responsive to received light intensity;
optics including a lens capable of forming an image of an object on the light-receiving surface;
an image shifting means for moving an image position on the light-receiving surface in a direction in which the pixels are arrayed by a distance N times a pixel spacing on the light receiving surface, where N is a positive integer, by moving the lens; and
an image processing means for processing images captured by the image capturing means;
wherein the image capturing means captures a first image and a second image on the light-receiving surface before and after movement of the image position on the light-receiving surface by the image shifting means in the direction in which the pixels are arrayed by the distance N times the pixel spacing on the light-receiving surface;
wherein the image processing means includes
a differential calculating section for calculating differences in output levels between pixels receiving light for the same part of the first image and the second image on the light-receiving surface captured by the image capturing means before and after movement of the image position on the light-receiving surface by the image shifting means in the direction in which the pixels are arrayed by the distance N times the pixel spacing on the light-receiving surface;

an offset amount calculating section for sequentially adding the differences in output levels between the pixels receiving light for the same part of the first image and the second image, calculated by the differential calculating section, for a pixel line arrayed in a direction of movement of the image position, so as to calculate an offset amount for output levels of pixels in the pixel line; and a correction section for correcting the output levels of the pixels in the pixel line so as to equalize variability in the output levels between the pixels in the pixel line, based on the offset amount for the output levels of the pixels in the pixel line, calculated by the offset amount calculating section.

2. The image capture device of claim 1, wherein the image processing means corrects the output levels of the pixels in the pixel line, according to respective positions of the pixels on the light-receiving surface so as to cancel out an effect of shading by the image capture device.

3. The image capture device of claim 1, wherein the image shifting means returns the image position back to a pre-movement image position after movement of the image position on the light-receiving surface in the direction in which the pixels are arrayed by the distance N times the pixel spacing on the light-receiving surface, and the image capturing means captures a third image on the light-receiving surface after returning the image position to the pre-movement position;

the image processing means calculates amounts of change in output levels between pixels receiving light for the same part of the first image and the third image on the light-receiving surface captured by the image capturing means before movement of the image position on the light-receiving surface by the image shifting means in the direction in which the pixels are arrayed by the distance N times the pixel spacing on the light-receiving surface and after returning of the image position to the pre-movement image position; and the offset amount calculating section eliminates the differences in output levels between pixels receiving light for the same part of the first image and the second image on the light-receiving surface, the pixels having the amounts of change in output levels calculated by the image processing means, that are equal to or greater than a predetermined reference value, in calculating the offset amount.

4. The image capture device of claim 1, wherein the pixels on the light-receiving surface are arrayed in a two dimensional matrix, and the direction in which the pixels are arrayed comprises a first alignment direction and a second alignment direction perpendicular to the first alignment direction;

the image shifting means causes the image position to move in the first alignment direction of the pixels on the light-receiving surface and in the second alignment direction perpendicular to the first alignment direction;

the image capture means captures the first image and the second image on the light-receiving surface before and after movement of the image position on the light-receiving surface in the first alignment direction, and captures a third image on the light-receiving surface after movement of the image position on the light-receiving surface in the second alignment direction;

wherein the differential calculating section calculates differences in output levels between pixels receiving light for the same part of the first image and the second image before and after movement of the image position in the first alignment direction as first differentials, and calculates differences in output levels between pixels receiving light for the same part of the first image and the third image before movement of the image position in the first alignment direction and after movement of the image position in the second alignment direction as second differentials; and wherein the offset amount calculating section sequentially adds the first differentials in a first pixel line arrayed in the first alignment direction to calculate first offset amounts for the pixels in the first pixel line, and sequentially adds the second differentials in a second pixel line arrayed in the second alignment direction to calculate second offset amounts for the pixels in the second pixel line; and wherein the correction section corrects the output levels of the pixels in the first and second pixel lines based on the first and second offset amounts.

5. The image capture device of claim 1, wherein:

the pixels on the light-receiving surface are arrayed in a two dimensional matrix, and the direction in which the pixels are arrayed comprises a first alignment direction and a second alignment direction perpendicular to the first alignment direction;

the image shifting means moves the image position on the light-receiving surface translationally so that a track of any given point of an image on the light-receiving surface describes a circular orbit on the light-receiving surface;

the image capturing means captures the first image and the second image on the light-receiving surface before and after movement of the image position on the light-receiving surface by the image shifting means so that the given point of the image on the light-receiving surface moves over a first predetermined part of the circular orbit along the first alignment direction of the pixels, and captures a third image on the light-receiving surface after movement of the image position on the light-receiving surface so that the given point of the image on the light-receiving surface moves over a second predetermined part of the circular orbit along the second alignment direction of the pixels;

the differential calculating section calculates differences in output levels between pixels receiving light for the same part of the first image and the second image before and after movement of the image position on the light-receiving surface by the image shifting means so that the given point of the image on the light-receiving surface moves over the first predetermined part of the circular orbit along the first alignment direction of the pixel, as first differentials, and calculates differences in output levels between pixels receiving light for the same part of the second image and the third image before and after movement of the image position on the light-receiving surface by the image shifting means so that the given point of the image moves over the second predetermined part of the circular orbit along the second alignment direction of the pixel, as second differentials;

the offset amount calculating section sequentially adds the first differentials in a first pixel line arrayed in the first alignment direction to calculate first offset amounts for the pixels in the first pixel line, and sequentially adds the second differentials in a second pixel line arrayed in the second alignment direction to calculate second offset amounts for the pixels in the second pixel line; and the correction section corrects the output levels of the pixels in the first and second pixel lines based on the first and second offset amounts.

6. The image capture device of claim 5, wherein the image shifting means moves the image position so that the desired point of the image on the light-receiving surface makes a continuous constant velocity circular movement.

7. The image capture device of claim 1, wherein:
the image capturing means and the image processing means comprise an image capture device;
the optics and the image shifting means comprise a lens unit detachable from the image capture device main body;
the image capture device main body outputs data including the pixel spacing on the light-receiving surface to the lens unit; and
the image shifting means moves the image position based on the data.

8. The image capture device of claim 1, wherein:
the image capturing means outputs a sync signal in sync with a timing at which an image on the light-receiving surface is captured; and
the image shifting means moves the image position based on the sync signal.

9. The image capture device of claim 1, wherein:
the image shifting means outputs a sync signal in sync with a timing at which the image position is moved; and
the image capturing means captures an image on the light-receiving surface based on the sync signal.

10. The image capture device of claim 1, wherein each of the image capturing elements is a bolometer or a microbolometer.

11. A pixel output level correcting method in an image capture device including an image capturing means having a light-receiving surface, arrayed on which are pixels comprising image capturing elements for outputting electrical signals at an output level responsive to received light intensity, and optics including a lens for forming an image of an object on the light-receiving surface, wherein:
an image position on the light-receiving surface is moved on the light-receiving surface in a direction in which the pixels are arrayed by a distance N times a pixel spacing on the light receiving surface, where N is a positive integer, by moving the lens;
a first image and a second image on the light-receiving surface are captured before and after movement of the image position in the direction in which the pixels are arrayed by the distance N times a pixel spacing on the light receiving surface;
differences in output levels between pixels receiving light for the same portion of the first image and the second image on the light-receiving surface captured before and after movement of the image position in the direction in which the pixels are arrayed by the distance N times the pixel spacing on the light receiving surface are calculated;
the calculated differences in output levels between the pixels receiving light for the same part of the first image and the second image are sequentially added for a pixel line arrayed in a direction of movement of the image position so that offset amount for output levels of pixels in the pixel line is calculated; and
the output levels of the pixels in the pixel line are corrected so as to equalize variability in the output levels between the pixels in the pixel line, based on the calculated offset amount.

12. An infrared camera system comprising:
an image capturing means having an infrared light-receiving surface, arrayed on which are pixels composed of image capturing elements for outputting electrical signals at output levels responsive to received light intensity;
optics including a lens capable of forming an image of an object on the light-receiving surface;
an image shifting means for moving an image position on the light-receiving surface in a direction in which the pixels are arrayed by a distance N times a pixel spacing on the light receiving surface, where N is a positive integer, by moving the lens; and
an image processing means for processing images captured by the image capturing means;
wherein the image capturing means captures a first image and a second image on the light-receiving surface before and after movement of the image position on the light-receiving surface by the image shifting means in the direction in which the pixels are arrayed by the distance N times the pixel spacing on the light receiving surface; and
the image processing means includes
a differential calculating section for calculating differences in output levels between pixels receiving light for a same part of the first image and the second image on the light-receiving surface captured by the image capturing means before and after movement of the image position in the direction in which the pixels are arrayed by the distance N times a pixel spacing on the light receiving surface;
an offset amount calculating section for sequentially adding the differences in output levels between the pixels receiving light for the same part of the first image and the second image, calculated by the differential calculating section, for a pixel line arrayed in a direction of movement of the image position, so as to calculate an offset amount for output levels of pixels in the pixel line; and
a correction section for correcting the output levels of the pixels in the pixel line so as to equalize variability in the output levels between the pixels in the pixel line, based on the offset amount for the output levels of the pixels in the pixel line, calculated by the offset amount calculating section.

13. An interchangeable lens system comprising:
an image capture device main unit; and
a lens unit removable from the image capture device main unit;
wherein the image capture device main unit includes an image capturing means having a light-receiving surface, arrayed on which are pixels composed of image capturing elements for outputting electrical signals at output levels responsive to received light intensity; and: an image processing means for processing images captured by the image capturing means,
wherein the lens unit includes optics having a lens capable of forming an image of an object on the light-receiving surface; and an image shifting means for moving an image position on the light-receiving surface in a direction in which the pixels are arrayed by a distance N times a pixel spacing on the light receiving surface, where N is a positive integer, by moving the lens;
wherein the image capturing means captures a first image and a second image on the light-receiving surface before and after movement of the image position on the light-receiving surface by the image shifting means in the direction in which the pixels are arrayed by the distance N times a pixel spacing on the light receiving surface, and wherein the image processing means includes a differential calculating section for calculating differences in output levels between pixels receiving light for a same part of the first image and the second image on the light-receiving surface captured by the image capturing means before and after movement of the image position in the direction in which the pixels are arrayed by the distance N times the pixel spacing on the light receiving surface; an offset amount calculating section for sequentially adding the differences in output levels between the pixels receiving light for the same part of the first image and the second image, calculated by the difference calculating section, for a pixel line arrayed in a direction of movement of the image position, so as to calculate an offset amount for output levels of pixels in the pixel line; and a correcting section for correcting the output levels of the pixels in the pixel line so as to equalize variability in the output levels between the pixels in the pixel line, based on the offset amount for the output levels of the pixels in the pixel line, calculated by the offset amount calculating section.

* * * * *